US012623149B2

(12) United States Patent
Ni

(10) Patent No.: US 12,623,149 B2
(45) Date of Patent: May 12, 2026

(54) VIRTUAL OBJECT CONTROL METHOD AND APPARATUS, COMPUTER DEVICE AND STORAGE MEDIUM

(71) Applicant: Tencent Technology (Shenzhen) Company Limited, Shenzhen (CN)

(72) Inventor: Weihui Ni, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 250 days.

(21) Appl. No.: 18/226,876

(22) Filed: Jul. 27, 2023

(65) Prior Publication Data

US 2023/0372819 A1 Nov. 23, 2023

Related U.S. Application Data

(63) Continuation of application No. PCT/CN2022/130750, filed on Nov. 9, 2022.

(30) Foreign Application Priority Data

Jan. 13, 2022 (CN) .......................... 202210035341.7

(51) Int. Cl.
 *A63F 13/56* (2014.01)
 *A63F 13/52* (2014.01)
(52) U.S. Cl.
 CPC .............. *A63F 13/56* (2014.09); *A63F 13/52* (2014.09)
(58) Field of Classification Search
 CPC .................................. A63F 13/56; A63F 13/52
 See application file for complete search history.

(56) References Cited

U.S. PATENT DOCUMENTS 6,966,837 B1 * 11/2005 Best ........................ A63F 13/52
                                                      463/32
8,062,110 B2 * 11/2011 Shimizu .................. A63F 13/42
                                                      463/2
(Continued)

FOREIGN PATENT DOCUMENTS

CN          111359211 A      7/2020
CN          111467790 A      7/2020
(Continued)

OTHER PUBLICATIONS

International Search Report and Written Opinion of PCT application PCT/CN2022/130750 dated Feb. 6, 2023 including translation, 15 pages.
(Continued)

*Primary Examiner* — Malina D. Blaise
(74) *Attorney, Agent, or Firm* — Crowell & Moring LLP

(57) ABSTRACT

This application relates to virtual object control, including: displaying a virtual scene including a first virtual object controlled by a user and a second virtual object not controlled by the user; in response to an operation against the second object, controlling the first object to fight against the second object in the virtual scene to reduce an attribute value of the second object; when the attribute value is less than a preset threshold, displaying conversion prompt information; in response to a conversion operation on the second object, playing a conversion animation, and displaying conversion progress indication information and object type options; and in response to the selection of a target object type option and the conversion progress indication information indicating the completion of playing of the conversion animation, converting the second object into a dependent virtual object of the first object.

19 Claims, 18 Drawing Sheets

(56) References Cited

U.S. PATENT DOCUMENTS

| | | | | |
|---|---|---|---|---|
| 10,402,731 | B1 * | 9/2019 | Cosic | G06N 5/022 |
| 11,344,809 | B2 * | 5/2022 | Kando | G06F 3/04842 |
| 2006/0252531 | A1 * | 11/2006 | Kando | A63F 13/335 |
| | | | | 463/36 |
| 2006/0252540 | A1 * | 11/2006 | Kando | A63F 13/10 |
| | | | | 463/36 |
| 2007/0260567 | A1 * | 11/2007 | Funge | A63F 13/67 |
| | | | | 706/47 |
| 2009/0295977 | A1 | 12/2009 | Sato | |
| 2010/0312995 | A1 * | 12/2010 | Sung | G06N 3/006 |
| | | | | 715/757 |
| 2011/0304630 | A1 * | 12/2011 | McNeely | G06T 13/20 |
| | | | | 345/473 |
| 2011/0304638 | A1 * | 12/2011 | Johnston | G06T 11/40 |
| | | | | 345/582 |
| 2014/0066200 | A1 * | 3/2014 | Matsui | A63F 13/2145 |
| | | | | 463/31 |
| 2017/0206797 | A1 * | 7/2017 | Solomon | G06N 3/006 |
| 2017/0225076 | A1 * | 8/2017 | Kharkar | A63F 13/56 |
| 2017/0354885 | A1 * | 12/2017 | Kitazono | A63F 13/47 |
| 2018/0264364 | A1 * | 9/2018 | Zou | A63F 13/822 |
| 2018/0308473 | A1 * | 10/2018 | Scholar | A63F 13/00 |
| 2019/0043239 | A1 * | 2/2019 | Goel | G06T 13/205 |
| 2019/0164007 | A1 * | 5/2019 | Liu | G06V 20/54 |
| 2019/0184286 | A1 * | 6/2019 | Du | A63F 13/67 |
| 2019/0197402 | A1 * | 6/2019 | Kovács | G06N 3/08 |
| 2019/0205727 | A1 * | 7/2019 | Lin | G06Q 40/04 |
| 2019/0295306 | A1 * | 9/2019 | Weston | A63F 13/56 |
| 2020/0122038 | A1 * | 4/2020 | Ebrahimi | G06N 3/045 |
| 2020/0122040 | A1 * | 4/2020 | Juliani, Jr. | G06N 3/091 |
| 2020/0145615 | A1 * | 5/2020 | Seko | G10L 17/26 |
| 2020/0197811 | A1 * | 6/2020 | Eatedali | A63F 13/67 |
| 2020/0368622 | A1 * | 11/2020 | Kando | G06F 1/1669 |
| 2020/0372400 | A1 * | 11/2020 | Carreira-Perpiñán | |
| | | | | G06F 16/9027 |
| 2020/0401576 | A1 * | 12/2020 | Yerli | G06T 7/70 |
| 2021/0286446 | A1 * | 9/2021 | Wang | G06F 3/04847 |
| 2022/0258056 | A1 * | 8/2022 | Jiang | A63F 13/426 |
| 2022/0309364 | A1 * | 9/2022 | Perry | A63F 13/56 |
| 2022/0387891 | A1 * | 12/2022 | Suenaga | A63F 13/53 |
| 2023/0271087 | A1 * | 8/2023 | Hu | A63F 13/56 |
| | | | | 463/31 |
| 2023/0310995 | A1 * | 10/2023 | Saeedi | A63F 13/67 |
| | | | | 463/43 |
| 2023/0381647 | A1 * | 11/2023 | Mizukami | A63F 13/52 |
| 2024/0082731 | A1 * | 3/2024 | Sato | A63F 13/822 |
| 2024/0108986 | A1 * | 4/2024 | Hoshino | A63F 13/58 |
| 2024/0131435 | A1 * | 4/2024 | Hoshino | A63F 13/822 |
| 2024/0218367 | A1 * | 7/2024 | Anderson | C07K 14/005 |
| 2024/0399249 | A1 * | 12/2024 | Xiong | A63F 13/69 |

FOREIGN PATENT DOCUMENTS

| | | |
|---|---|---|
| CN | 112870699 A | 6/2021 |
| CN | 113318445 A | 8/2021 |
| CN | 113398601 A | 9/2021 |
| CN | 114367109 A | 4/2022 |

OTHER PUBLICATIONS

Chinese-language Office Action issued in Chinese Application No. 202210035341.7 dated Feb. 14, 2025 with English translation (23 pages).

Big Whale; "[Assassin's Creed Odyssey] Tips | 16 must-read tips for beginners", dated Oct. 17, 2021 https://www.bilibili.com/video/BV1EU4y1F7dK/?spm_id_from=333.337.search-card.all.click&vd_source=5cd74de20ed05a078c637d5a77857fe2 (4 pages).

Mobile Client Mini World; "How to tame monsters in Mini World?", dated Sep. 9, 2021 https://m.ali213.net/wenda/106331.html (2 pages).

Chinese-language Office Action issued in Chinese Application No. 202210035341.7 dated Jun. 13, 2025 with English translation (15 pages).

Big Whale; "[Assassin's Creed Odyssey] Tips | 16 must-read tips for beginners", uploaded Oct. 16, 2021, https://www.bilibili.com/video/BV1EU4y1F7dK/?spm_id_from=333.337.search-card.all.click&vd_source=5cd74de20ed05a078c637d5a77857fe2 (3 pages).

* cited by examiner

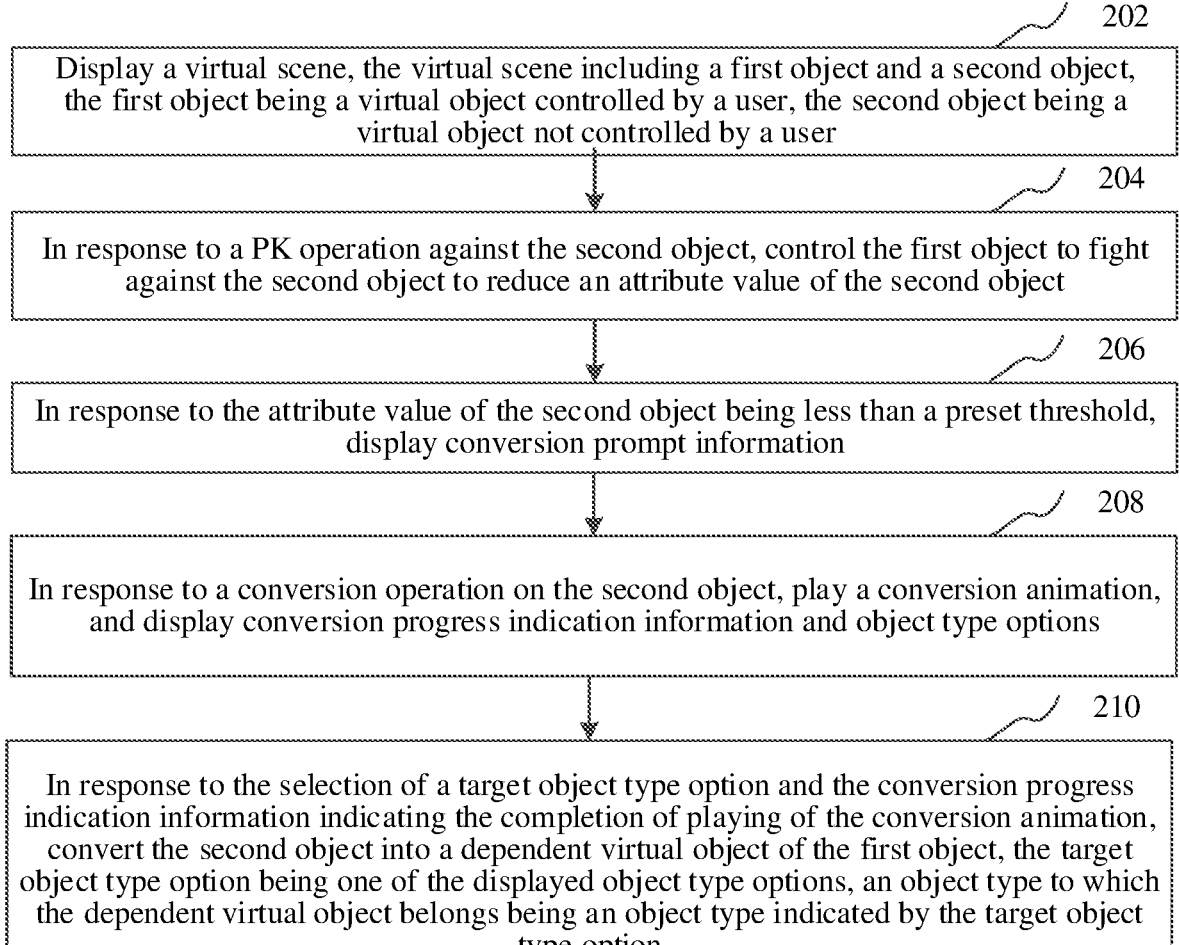

202

Display a virtual scene, the virtual scene including a first object and a second object, the first object being a virtual object controlled by a user, the second object being a virtual object not controlled by a user

204

In response to a PK operation against the second object, control the first object to fight against the second object to reduce an attribute value of the second object

206

In response to the attribute value of the second object being less than a preset threshold, display conversion prompt information

208

In response to a conversion operation on the second object, play a conversion animation, and display conversion progress indication information and object type options

210

In response to the selection of a target object type option and the conversion progress indication information indicating the completion of playing of the conversion animation, convert the second object into a dependent virtual object of the first object, the target object type option being one of the displayed object type options, an object type to which the dependent virtual object belongs being an object type indicated by the target object type option

FIG. 2

Display region of virtual scene

Peripheral region

Focus region

Peripheral region

Display region of virtual scene

Object type option

Option indication region

Focus region

CRUSHER

Object type option

ARTILLERY

VIRTUAL OBJECT CONTROL METHOD AND APPARATUS, COMPUTER DEVICE AND STORAGE MEDIUM

RELATED APPLICATION

This application is a continuation of International Patent Application No. PCT/CN2022/130750, filed Nov. 9, 2022, which claims priority to Chinese Patent Application No. 202210035341.7, entitled "VIRTUAL OBJECT CONTROL METHOD AND APPARATUS, COMPUTER DEVICE AND STORAGE MEDIUM" filed to the China National Intellectual Property Administration on Jan. 13, 2022. The contents of International Patent Application No. PCT/CN2022/130750 and Chinese Patent Application No. 202210035341.7 are each incorporated herein by reference in their entirety.

FIELD OF THE TECHNOLOGY

This application relates to the field of computer technologies, and more particularly, to a virtual object control method and apparatus, a computer device and a storage medium.

BACKGROUND OF THE DISCLOSURE

With the development of computer technologies, virtual scenes are applied to more and more scenes. The virtual scenes may, for example, be virtual scenes in games or anime, wherein each virtual scene may include virtual objects controlled by users through user terminals, and the users can control the virtual objects through the user terminals to interact (such as, a player kill (PK)) in the virtual scenes.

At present, in the process of users controlling virtual objects in a virtual scene through user terminals to perform PK, virtual PK objects are usually destroyed, resulting in certain limitations in the way of interaction.

SUMMARY

According to various embodiments provided in this application, a virtual object control method and apparatus, a computer device, a storage medium and a computer program product are provided.

A virtual object control method is performed by a computer device. The method includes: displaying a virtual scene, the virtual scene including a first object and a second object, the first object being a virtual object controlled by a user, the second object being a virtual object not controlled by a user; in response to a PK operation against the second object, controlling the first object to fight against the second object to reduce an attribute value of the second object; in response to the attribute value of the second object being less than a preset threshold, displaying conversion prompt information; in response to a conversion operation on the second object, playing a conversion animation, and displaying conversion progress indication information and object type options; and in response to the selection of a target object type option and the conversion progress indication information indicating the completion of playing of the conversion animation, converting the second object into a dependent virtual object of the first object, the target object type option being one of the displayed object type options, an object type to which the dependent virtual object belongs being an object type indicated by the target object type option.

A virtual object control apparatus includes: a virtual scene displaying module, configured to display a virtual scene, the virtual scene including a first object and a second object, the first object being a virtual object controlled by a user, the second object being a virtual object not controlled by a user; a PK operation responding module, configured to, in response to a PK operation against the second object, control the first object to fight against the second object to reduce an attribute value of the second object; a conversion prompt information displaying module, configured to, in response to the attribute value of the second object being less than a preset threshold, display conversion prompt information; a conversion operation responding module, configured to, in response to a conversion operation on the second object, play a conversion animation, and display conversion progress indication information and object type options; and an object conversion module, configured to, in response to the selection of a target object type option and the conversion progress indication information indicating the completion of playing of the conversion animation, convert the second object into a dependent virtual object of the first object, the target object type option being one of the displayed object type options, an object type to which the dependent virtual object belongs being an object type indicated by the target object type option.

A computer device is provided, which includes a memory and one or more processors. The memory stores computer-readable instructions therein. The computer-readable instructions, when executed by the processors, cause the one or more processors to perform the steps in the above virtual object control method.

One or more non-volatile computer-readable storage mediums are provided, which store computer-readable instructions therein. The computer-readable instructions, when executed by one or more processors, cause the one or more processors to perform the steps in the above virtual object control method.

A computer program product is provided, which includes computer-readable instructions. The computer-readable instructions, when executed by a processor, perform the steps in the above virtual object control method.

Details of one or more embodiments of this application are provided in the accompanying drawings and descriptions below. Other features, objectives, and advantages of this application become apparent from the Description, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 2 is a schematic flowchart of a virtual object control method in some embodiments;

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Figure 1:
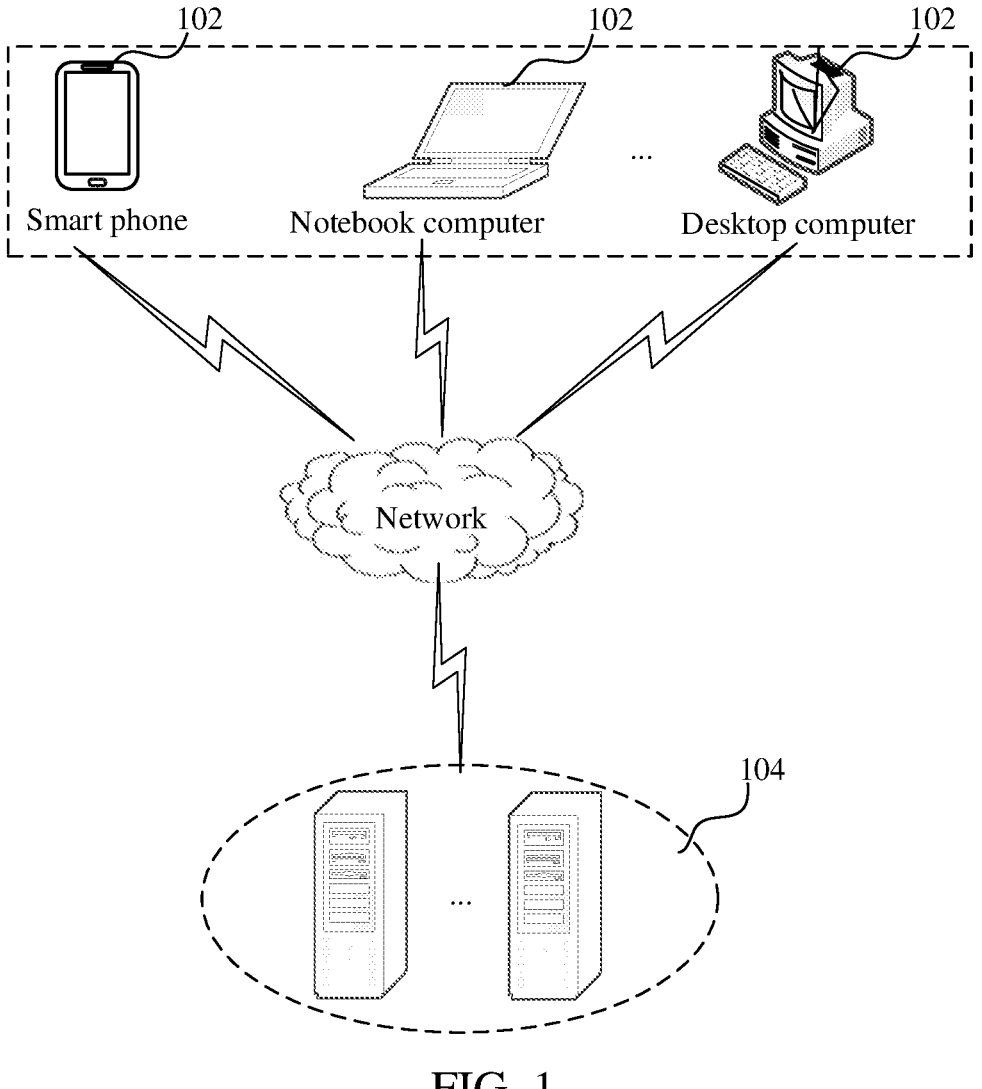
FIG. 1 is a diagram of an application environment of a virtual object control method in some embodiments.

A virtual object control method provided by this application may be applied to an application environment shown in FIG. 1. The application environment includes a terminal 102 and a server 104. The terminal 102 communicates with the server 104 via a network.

Specifically, the terminal 102 may display a virtual scene, the virtual scene including a first object and a second object, the first object being a virtual object controlled by a user, the second object being a virtual object not controlled by a user; in response to a PK operation against the second object, control the first object to fight against the second object to reduce an attribute value of the second object; in response to the attribute value of the second object being less than a preset threshold, display conversion prompt information; in response to a conversion operation on the second object, play a conversion animation, and display conversion progress indication information and object type options, the number of the object type options and object types indicated by the object type options being determined according to the number and types of target virtual resources in a virtual backpack of the first object; and in response to the selection of a target object type option and the conversion progress indication information indicating the completion of playing of the conversion animation, convert the second object into a dependent virtual object of the first object, the dependent virtual object being dependent of the first object, the target object type option being one of the displayed object type options, an object type to which the dependent virtual object belongs being an object type indicated by the target object type option.

The virtual object control method provided by this application may be jointly executed by the terminal and the server. For example, the terminal may send information represented by the selected object type option to the server 104. In response to receiving the information represented by the object type option, the server 104 sends an object displaying instruction to the terminal 102, the object displaying instruction being used to trigger the display of the dependent virtual object. In response to receiving the object displaying instruction, the terminal 102 displays the dependent virtual object.

The terminal 102 may be, but is not limited to, any personal computer, notebook computer, smart phone, tablet computer, portable wearable device and the like. The server 104 may be implemented by an independent server or a server cluster composed of a plurality of servers.

The virtual object control method provided by this application may be applied in the field of games and animations, for example, may be used to control virtual objects in games or animations.

The virtual object control method provided by this application may be based on artificial intelligence. For example, the virtual objects in this application may be synthesized based on artificial intelligence. For example, an object synthesis model may be configured to generate the virtual objects. The object synthesis model is a neural network model configured to synthesize the virtual objects.

The user information (including but not limited to user device information, user personal information, etc.) and data (including but not limited to data used for analysis, stored data, displayed data, etc.) involved in this application are information and data authorized by the user or fully authorized by all parties. In addition, the collection, use and processing of relevant data need to comply with relevant laws, regulations and standards of relevant countries and regions. For example, a virtual scene involved in this application and information of a device interacting with the virtual scene are acquired with full authorization.

In some embodiments, as shown in FIG. 2, a virtual object control method is provided. The method may be performed by a terminal, or by both a terminal and a server. In an embodiment of this application, the method is described by taking it being applied to the terminal 102 in FIG. 1 as an example. The method includes the following steps.

Step 202: Display a virtual scene, the virtual scene including a first object and a second object, the first object being a virtual object controlled by a user, the second object being a virtual object not controlled by a user.

The virtual scene is a scene that is presented when an application program is running on the terminal. The virtual scene may be any one of a simulated scene for the real world, a semi-simulated and semi-fictional scene, a purely fictional scene, a three-dimensional scene or a two-dimensional scene. The application program may be, for example, a game application program or an anime application program.

The virtual scene may include one or more virtual objects. "A plurality of" means at least two. The virtual object is an object in the virtual scene, which may be at least one of a virtual character or a virtual animal, and the virtual character may be, for example, an anime character. The virtual animal may be, for example, a monster in a game. The virtual object may be controlled by a computer device or by a user device that is used by a user.

Figure 3:
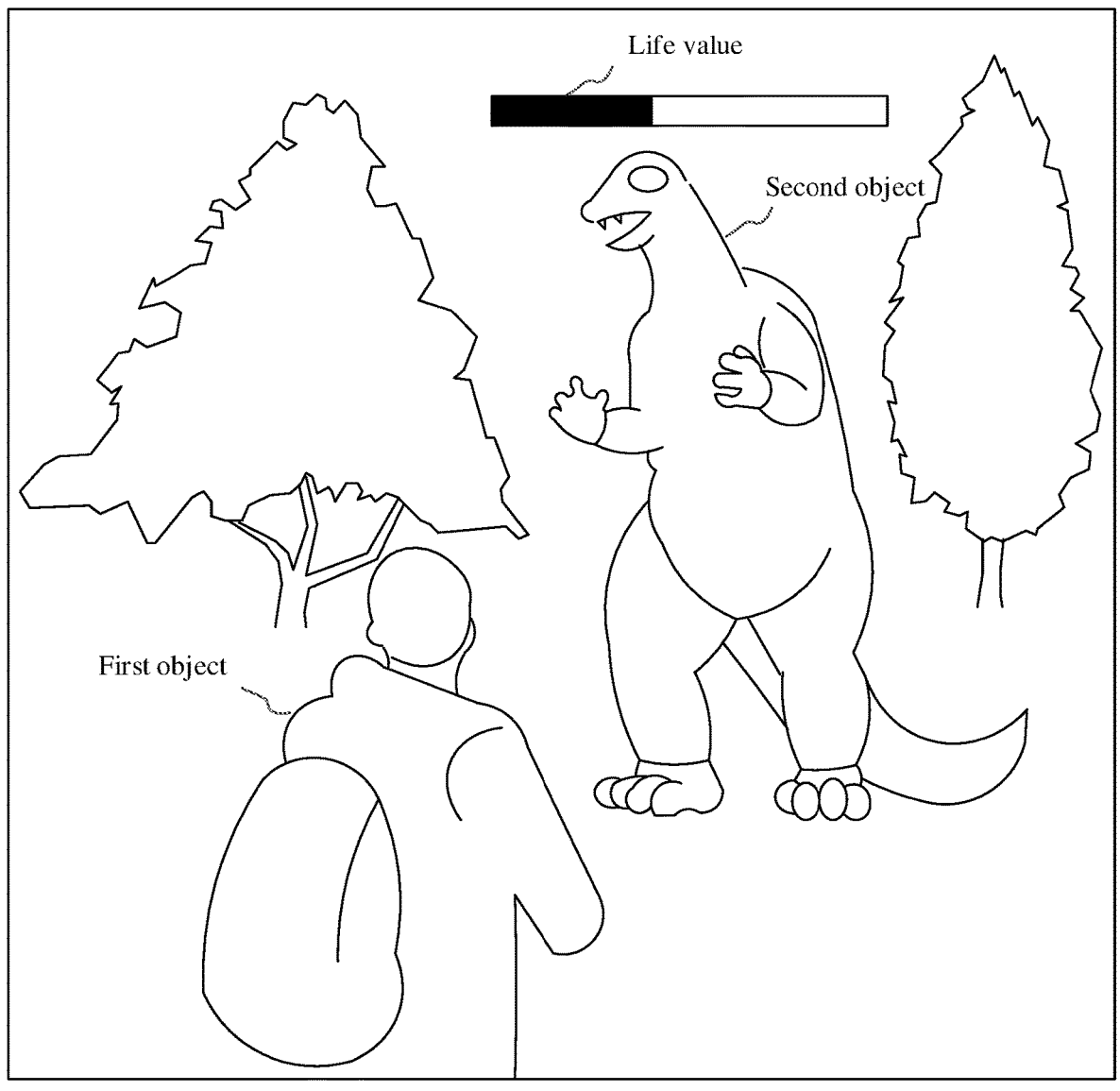
FIG. 3 is a schematic diagram of a screen of a virtual scene in some embodiments.

The virtual scene includes a first object and a second object. The first object is a virtual object controlled by the user, which may be a virtual character. The second object is a virtual object not controlled by a user, which may be a virtual animal, for example, a virtual monster. The virtual objects in the virtual scene can interact with each other, for example, can fight against each other. For example, in response to the virtual scene being a scene in a shooting game, the virtual objects can shoot with each other. There may be a PK relationship between the first object and the second object. As shown in FIG. 3, a virtual scene is shown, the virtual scene including a first object and a second object. It can be seen from the drawing that the first object is a virtual character, and the second object is a virtual monster.

Figure 4:
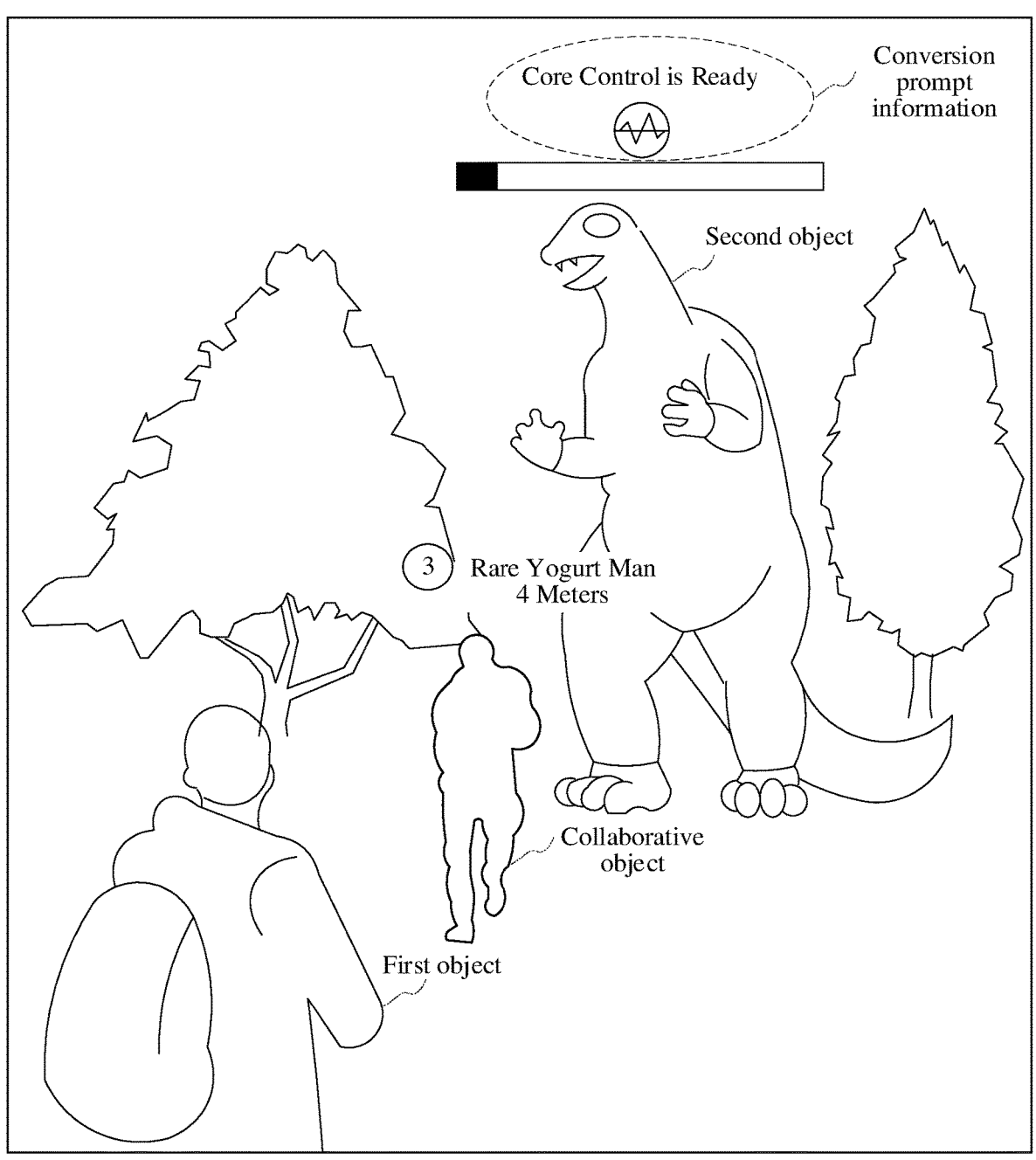
FIG. 4 is a schematic diagram of a screen of a virtual scene in some embodiments.

In some embodiments, the virtual scene may also include a collaborative object of the first object, but there is no PK relationship between the collaborative object of the first object and the second object. For example, the collaborative object of the first object may be a virtual object that belongs to the same team as the first object. The collaborative object may be controlled by a user. The user who controls the collaborative object is a different user than a user who controls the first object. As shown in FIG. 4, a virtual scene is shown, the virtual scene including a first object, a second object and a collaborative object. In the drawing, "Rare Yogurt Man" is a name of the collaborative object, and "4 Meters" is a distance between the first object and the collaborative object. In the drawing, the first object is a virtual character, and the second object is a virtual monster. In this embodiment, the virtual scene includes the collaborative object of the first object. Therefore, the virtual object control method provided by this application may be applied to a collaborative virtual scene, enriching applicable scenes.

Step 204: In response to a PK operation against the second object, control the first object to fight against the second object to reduce an attribute value of the second object.

The PK operation against the second object is triggered under the control of the user who controls the first object and is used to fight against the second object. The PK operation includes, but is not limited to, an attack, for example, a shot. The PK operation may reduce the attribute value of the second object. The attribute value of the second object includes, but is not limited to, a life value of the second object.

Specifically, in response to the terminal receiving the PK operation of the first object against the second object, the first object is controlled to fight against the second object, and a value by which the PK operation reduces the attribute value of the second object is counted and subtracted from the attribute value of the second object to obtain a reduced attribute value. The terminal may display the attribute value of the second object in real time.

Step 206: In response to the attribute value of the second object being less than a preset threshold, display conversion prompt information.

The preset threshold is a preset value, which may be, for example, 100 in response to the attribute value being the life value. The conversion prompt information is used to prompt that the second object meets a condition of being converted into a dependent virtual object of the first object. The dependent virtual object of the first object may be a virtual object controlled by the user who controls the first object. The conversion prompt information includes, but is not limited to, at least one of a picture or text.

Specifically, in response to the terminal detecting that the attribute value of the second object is less than the preset threshold, the terminal may display, for the second object, the conversion prompt information corresponding to the second object, in response to the fact that the attribute value of the second object is less than the preset threshold. A display position of the conversion prompt information may be determined based on a position of the second object. For example, a relative relationship between the display position of the conversion prompt information and the position of the second object may be preset, wherein the position of the second object is determined in response to displaying the conversion prompt information, the display position of the conversion prompt information is determined based on the position of the second object and the relative relationship, and the conversion prompt information is displayed in the display position. Taking the attribute value being the life value as an example, black rectangular regions in FIG. 3 and FIG. 4 represent the magnitudes of the life value, the longer the black rectangular region, the larger the life value. In event that the terminal detects that a monster's (i.e., the second object's) blood volume value (i.e., life value) decreases from the magnitude in FIG. 3 to the magnitude in FIG. 4, the life value is determined to be less than the preset threshold, and then the monster will be weak and enter a fallen state without any ability to attack. Meanwhile, the conversion prompt information is displayed at a position above the monster's head, the conversion prompt information including words "Chip-controlled is Ready" and a prompt icon to prompt a player to perform "Chip-controlled". The phrase "Chip-controlled" refers to converting the second object into the dependent virtual object of the first object.

In some embodiments, in response to the attribute value of the second object being less than the preset threshold, the second object meets a condition of being converted into the dependent virtual object of the first object. The dependent virtual object of the first object may be a virtual object controlled by the user who controls the first object. In event that the second object is a monster, the process of converting the second object into the dependent virtual object of the first object may also be referred to as a process of monster SYNC, where the monster SYNC may be referred to as monster synchronization or monster conversion. Monster SYNC is used to convert a wild monster into a monster controllable by a player. A monster generated by monster SYNC is a monster synthesized from nano elements in game settings. The wild monster may be a wild elite monster that is randomly refreshed by game software.

Step 208: In response to a conversion operation on the second object, play a conversion animation, and display conversion progress indication information and object type options.

The conversion operation is an operation that triggers the conversion of the second object into the dependent virtual object of the first object. The conversion operation may be a press operation on a key on a keyboard, for example, a continuous press operation on keys on the keyboard. The conversion operation may also be a touch operation, for example, an operation on buttons on a display screen that displays the virtual scene, or for example, an operation on buttons on a mobile phone screen. In event that the conversion prompt information is a button, the conversion operation may be an operation on the conversion prompt information, including but not limited to clicking, sliding, and other operations on the conversion prompt information.

The conversion operation may be triggered automatically by the terminal, or by a user through the terminal or by a device communicating with the terminal. The device that triggers the conversion operation includes but is not limited to any one of a mouse, a keyboard or a gamepad, wherein the keyboard may be a keyboard of the terminal itself or a keyboard that communicates with the terminal by wired or wireless means, and the mouse and the gamepad communicate with the terminal by wired or wireless means. For example, the conversion operation may be a press operation on a specified key on the keyboard, wherein the specified key may be preset or set as needed. For example, the conversion operation may be a press operation on a key "Q". The press operation may be, for example, a long press operation.

Figure 5:
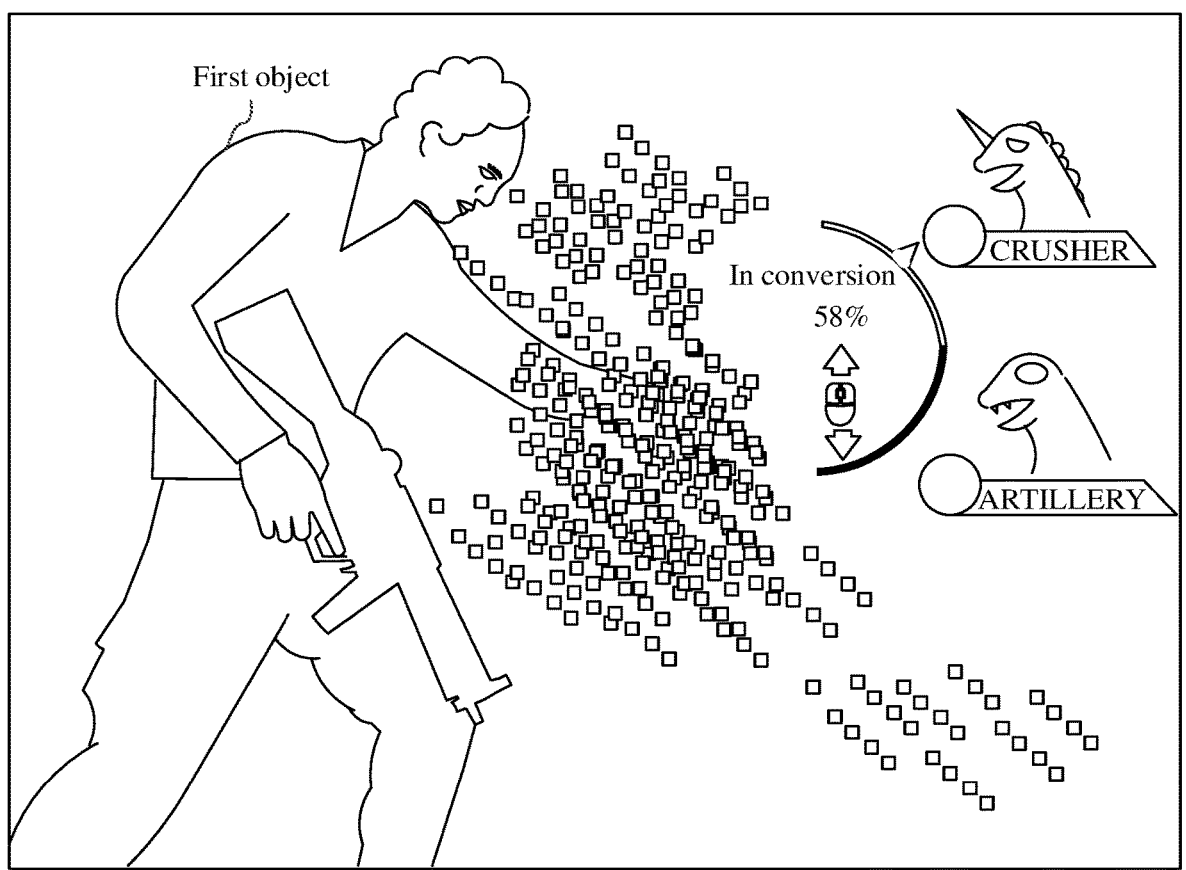
FIG. 5 is a schematic diagram of a conversion animation in some embodiments.

The conversion animation is configured to demonstrate the process of converting the second object into the dependent virtual object of the first object. The conversion animation may include both the first object and the second object. As shown in FIG. 5, the conversion animation is shown, including the first object. The conversion animation may be generated in advance, or generated instantaneously according to the first object and the second object. For example, in the process of monster SYNC, a player approaches a monster in a weak state and long presses a key "Q", and then a client (terminal) determines the acquisition of the conversion operation and plays the conversion animation.

Conversion progress indication information is used for indicating a progress of the conversion, and may include progress statistics which may indicate statistics in either forward timing or countdown. It may be expressed as a percentage, or a specific duration number. For example, in a case that the forward timing is used and the percentage represents dynamic progress statistics, the progress statistics may be 50% when the conversion is halfway through. The progress statistics may also be a specific duration number, for example, 2 seconds. The progress statistics is, for example, 58% in FIG. 5.

The object type options are used to characterize a class of virtual objects, and different object type options indicate different object types. The virtual objects of the same class have the same attributes, while different classes of virtual objects have different or completely different attributes. The object type options include, but are not limited to, at least one of a name of the virtual object and an image that represents the virtual object. The number of object type options may be less than or equal to a number threshold, which may be set or preset as needed, for example, may be, 2. The object types may be pre-set, including but not limited to "ARTILLERY", "CRUSHER", and the like. "ARTILLERY" may be, for example, represented by "CRUSHER", and "CRUSHER" may be, for example, represented by "ARTILLERY".

The number of object option types and the object types indicated by the object type options may be determined according to a level of a user (for example, a player) controlling a first virtual object. For example, as the player's level increases, an object type option indicating a new object type is newly added.

Figure 6:
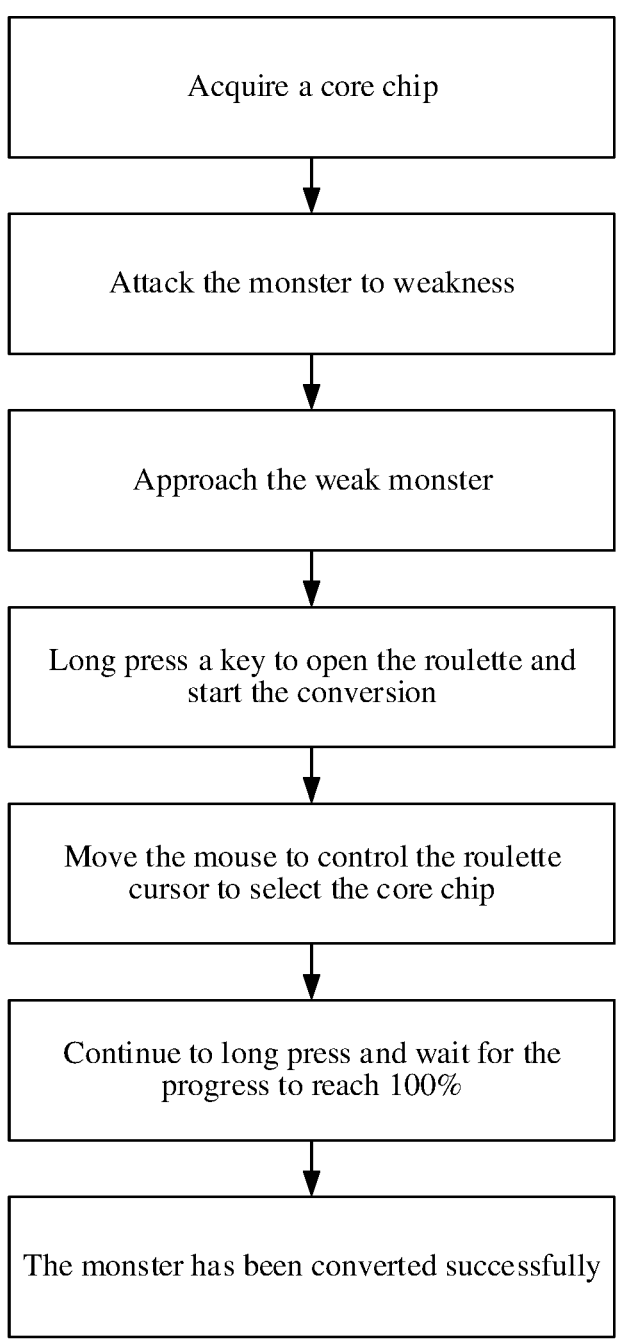
FIG. 6 is a flowchart of the generation of a dependent virtual object in some embodiments.
Figure 7:
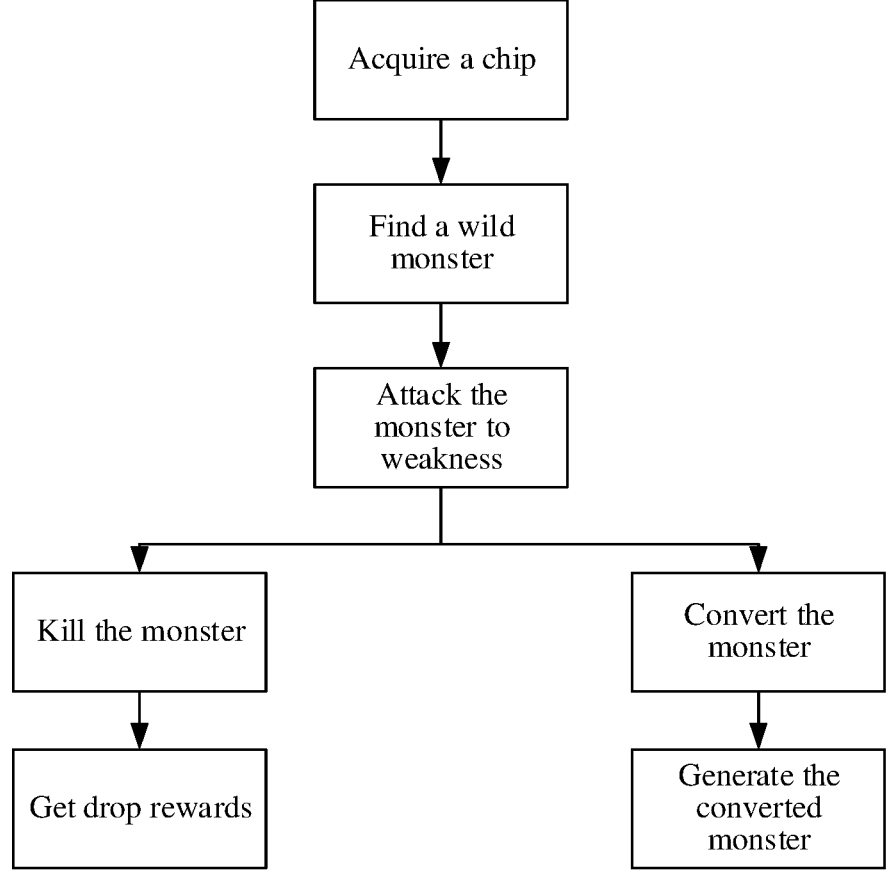
FIG. 7 is a flowchart of the generation of a dependent virtual object in some embodiments.

In some embodiments, the number of the object type options and the object types indicated by the object type options may also be determined according to the number and types of target virtual resources in a virtual backpack of the first object. The virtual backpack refers to a virtualized backpack in which the first object in the virtual scene stores virtual resources. The virtual resources refer to virtualized resources, and the target virtual resources refer to virtual resources that are used to generate the dependent virtual object. When the target virtual resources exist in the virtual backpack of the first object, the first object has an ability to convert the second object into the dependent virtual object. For example, each target virtual resource may be a virtualized "Core Chip" in a game, and there may be a plurality of types of "Core Chips". Different "Core Chips" are configured to convert the second object into different types of virtual objects, that is, different object types corresponding to different "Core Chips". When the target virtual resource is the "Core Chip", the conversion animation may also become a "Chip-controlled Animation", and an instruction triggered by the conversion operation may be referred to as a "Chip-controlled Operation". The instruction triggered by the conversion operation may also be referred to as a "Chip-controlled Instruction". For example, as shown in FIG. 6 and FIG. 7, in the process of monster SYNC (conversion), a player approaches a monster in a weak state and long presses a key "Q", and then a client (terminal) determines the acquisition of the "Chip-controlled Instruction" and plays the "Chip-controlled Animation". The player has the ability of monster SYNC after obtaining the core chip. There may be a plurality of core chips, which may include but be not limited to at least one of a melee monster, a ranged monster or a shield monster. The type of the converted monster depends on a type of "Core Chip" acquired by the player in the game. The process of monster SYNC shows a game characteristic of monster SYNC. When it is necessary to play the conversion animation, the terminal may use an animation of fixing a camera position, so as to play the conversion animation. For example, in the process of monster SYNC, there may be an animation of fixing a camera position in the game to show the entire monster SYNC process. For example, this animation is about 5 seconds and shows a roulette user interface (UI). In the course of playing the animation, the roulette UI is used to select different types of SYNC monsters, so as to make reasonable use of a time when the first object cannot be manipulated in this gameplay.

Figure 8:
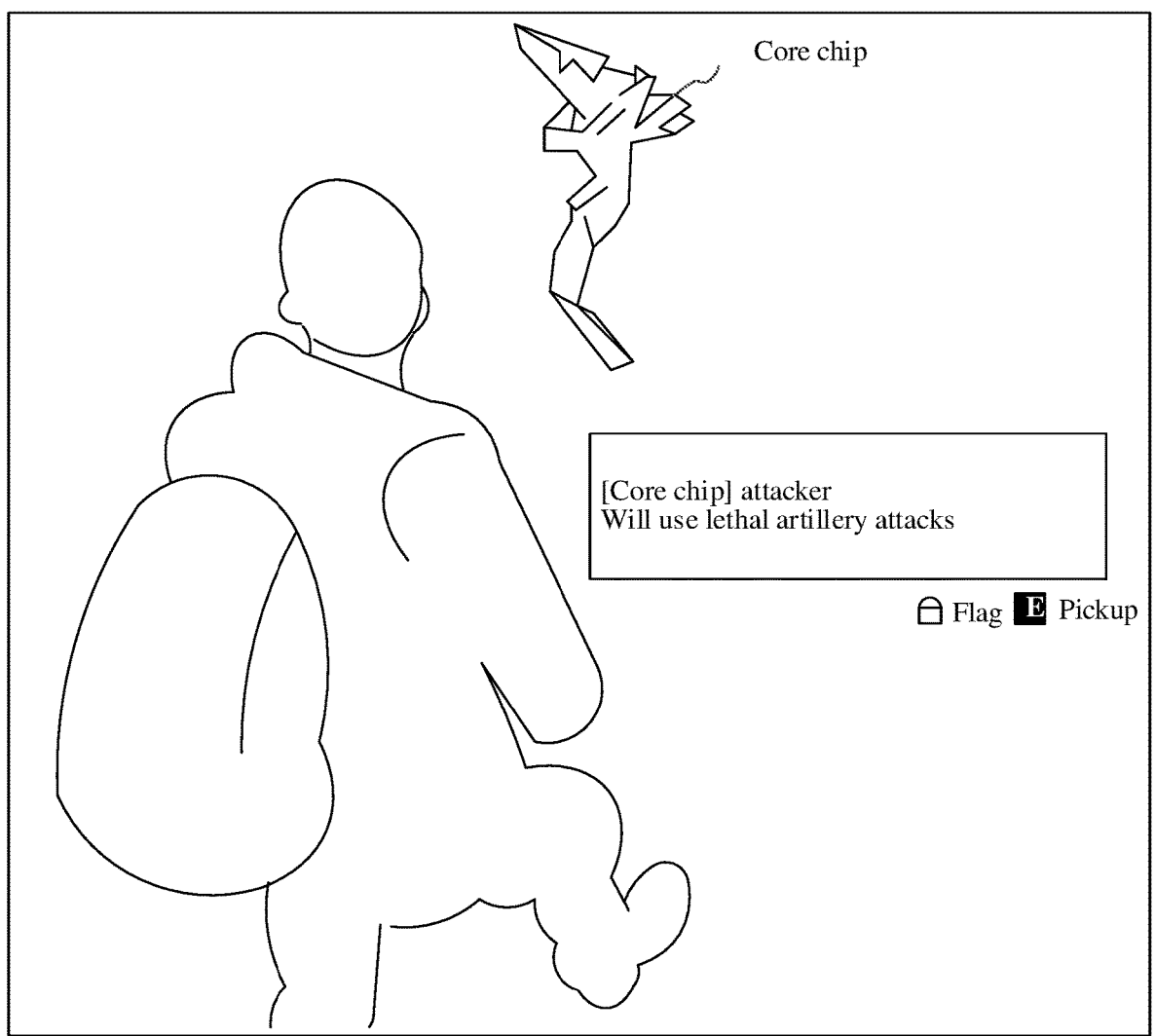
FIG. 8 is a schematic diagram of a screen of a virtual scene in some embodiments.

The virtual resources may be automatically assigned to the first object by a computer, or may be assigned to the first object in response to controlling the first object to perform a task. For example, the player may acquire a core chip by picking it up on the ground, killing a wild monster, buying it from a store, etc. As shown in FIG. 8, an animation of acquiring the core chip is shown. In the drawing, descriptive information on the core chip is shown, the description information including a type of the core chip, i.e., "Attacker", and a function "will use lethal artillery attacks" of the core chip. The type of the core chip refers to a type of a monster generated using the core chip, and the function of the core chip refers to a function of the monster generated using the core chip.

The object types corresponding to the dependent virtual objects generated by different target virtual resources are different. That is, the object types of the dependent virtual objects converted from different target virtual resources are different. The number of object type options may be the same as the number of target virtual resources. Each target virtual resource corresponds to one object type. Through the target virtual resources, the second object may be converted into a dependent virtual object of the first object, and an object type of the converted dependent virtual object is an object type corresponding to this target virtual resource. For example, there may be two target virtual resources, which is a target virtual resource 1 and a target virtual resource 2 respectively, an object type corresponding to the target virtual resource 1 being an object type A, an object type corresponding to the target virtual resource 2 being an object type B. Then, there may also be two object type options, an object type indicated by one object type option being an object type A, and an object type indicated by the other object type option being an object type B. In the above embodiment, the number of object type options and the object types indicated by the object type options are determined using the number and types of target virtual resources in the virtual backpack of the first object, which broadens interaction modes, and improves an effective utilization rate of computer resources.

Specifically, the terminal may perform real-time statistics on a playing duration of the conversion animation, determine a statistical result as the progress statistics, and display the progress statistics. For example, at the beginning of playing the conversion animation, the progress statistics is displayed as 0%; and upon the completion of playing of the conversion animation, the progress statistics is displayed as 100%. In the process of monster SYNC, the progress statistics may also be referred to as a SYNC progress. The progress statistics may be used for indicating a process progress. For example, the monster SYNC process is used to convert a wild monster into a monster controllable by a player. In the monster SYNC process, in response to the conversion operation being a press operation on a key "Q" of a keyboard and needing to keep pressing the key "Q" of the keyboard prior to completing the SYNC process, the progress statistics may be used for indicating the process progress, so that the player knows how long they need to long press. For example, in a case that the player long presses the key until the process of the progress statistics representation process is completed (for example, represented by 100%), the player stops pressing the key "Q".

In some embodiments, in response to the terminal receiving the conversion operation on the second object, the terminal may determine whether the attribute value of the second object is less than the preset threshold, and respond to the conversion operation on the second object if the attribute value of the second object is less than the preset threshold. In response to determining that the attribute value of the second object is greater than the preset threshold, the terminal rejects to respond to the conversion operation on the second object.

In some embodiments, the terminal may determine the second object directed by the conversion operation based on a distance between the first object and the virtual object which is not controlled by a user. For example, in response to receiving the conversion operation, the terminal determines a distance between a first virtual object and a virtual object that has an attribute value less than the preset threshold and is not controlled by a user. In a case that the distance is less than a distance threshold, the virtual object that has the attribute value less than the preset threshold and is not controlled by the user is determined to be the second object directed by the conversion operation. For example, the user may control the first object to approach a monster that shows "Chip-controlled is Ready" and long press the "Q" key on the keyboard to start the conversion of the monster into the dependent virtual object of the first object. The process of converting the virtual object that is not controlled by the user into the dependent virtual object of the first object may also be referred to as the monster SYNC process.

Step 210: In response to the selection of a target object type option and the conversion progress indication information indicating the completion of playing of the conversion animation, convert the second object into a dependent virtual object of the first object, the target object type option being one of the displayed object type options, an object type to which the dependent virtual object belongs being an object type indicated by the target object type option.

The target object type option is the selected object type option. The target object type option may be selected automatically or in response to an option selection event. The option selection event is an event that selects an object type option from the displayed object type option. There is a dependency relationship between the dependent virtual object and the first object, and the dependent virtual object of the first object is a virtual object owned by the first object.

Specifically, in response to determining that the conversion progress indication information indicating the completion of playing of the conversion animation, the terminal determines the target object type option selected in response to the completion of playing of the conversion animation, converts the second object to the dependent virtual object of the first object, and determines that the object type of the converted dependent virtual object is an object type indicated by the target object type option.

In some embodiments, in response to the completion of playing of the conversion animation, the terminal cancels displaying the conversion progress indication information and the object type option.

In some embodiments, in the playing process of the conversion animation, the terminal stops responding to a control operation on the first virtual object. The control operation is used to trigger and control the first virtual object to perform a corresponding behavior, the behavior including, but not limited to, at least of shooting, moving, or jumping or other behavior.

The above virtual object control method includes: displaying a virtual scene, the virtual scene including a first object and a second object, the first object being a virtual object controlled by a user, the second object being a virtual object not controlled by a user; in response to a PK operation against the second object, controlling the first object to fight against the second object to reduce an attribute value of the second object; in response to the attribute value of the second object being less than a preset threshold, displaying conversion prompt information; in response to a conversion operation on the second object, playing a conversion animation, and displaying conversion progress indication information and object type options; and in response to the selection of a target object type option and the conversion progress indication information indicating the completion of playing of the conversion animation, converting the second object into a dependent virtual object of the first object, the target object type option being one of the displayed object type options, an object type to which the dependent virtual object belongs being an object type indicated by the target object type option. The process of fighting against the second object means to convert the second object into the dependent virtual object of the first object in response to the attribute value of the second object being less than a preset threshold, so the interaction mode is broadened. In addition, by converting the second object into the dependent virtual object, this resource of the second object is fully utilized to increase a utilization rate of the virtual object, thereby saving computer resources consumed in the process of generating the virtual object. In some embodiments, a display region of the virtual scene includes a visual field focus region and a visual field peripheral region other than the visual field focus region. The visual field focus region is a region focused by a user's sight line within a preset range centered on a center point of the display region. The object type option is displayed in the visual field peripheral region.

Figure 9:
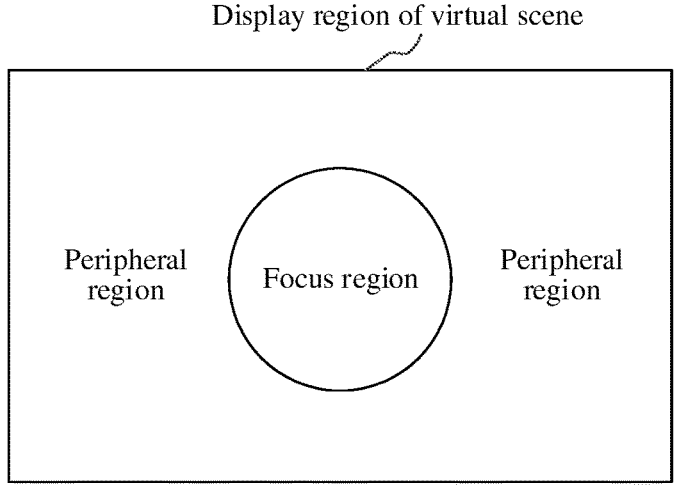
FIG. 9 is a division diagram of a visual field peripheral region and a visual field focus region in some embodiments.

The display region of the virtual scene refers to a screen region that shows a screen in the virtual scene. The center position of the visual field focus region is a position of the center point of the display region. The visual field focus region is a region focused by a user's sight line within a preset range with the center point of the display region as a reference center. It may be understood that users focus on this region while playing the game. The visual field peripheral region is a region in the display region of the virtual scene except the visual field focus region. The size and shape of the preset range may be preset. For example, the preset range may be a circular region which takes the center point of the display region as a circle center and a target length as a radius. The target length may be preset or set as needed. As shown in FIG. 9, the visual field focus region and the visual field peripheral region are shown in the display region of the virtual scene. A "focus region" in the drawing refers to the visual field focus region, and a "peripheral region" refers to a visual field peripheral region. As can be seen from the drawing, the visual field focus region is a circular region that takes a center point of the display region as a circle center.

In this embodiment, since the object type option is displayed in the visual field peripheral region, the obstruction to the user's sight line is reduced, the interference in the process of human-computer interaction is reduced, and the efficiency of human-computer interaction is improved.

In some embodiments, displaying the conversion progress indication information includes: displaying an option indication region in a position in the display region deviating from the center point of the visual field focus region; and displaying the conversion progress indication information and an option indication flag in the option indication region, the option indication flag being used for indicating the selected object type option. Displaying the conversion progress indication information and the object type options includes: displaying an option indication region in a position in the display region deviating from the center point of the visual field focus region, and displaying the object type options in the visual field peripheral region; and displaying the conversion progress indication information and the option indication flag in the option indication region, the option indication flag being used for indicating the selected object type option.

The option indication region is used for indicating the selected object type option. In event that the option indication region is displayed in the position in the display region deviating from the center point of the visual field focus region, the position of the center point of the option indication region does not coincide with the position of the center point of the visual field focus region.

Figure 10:
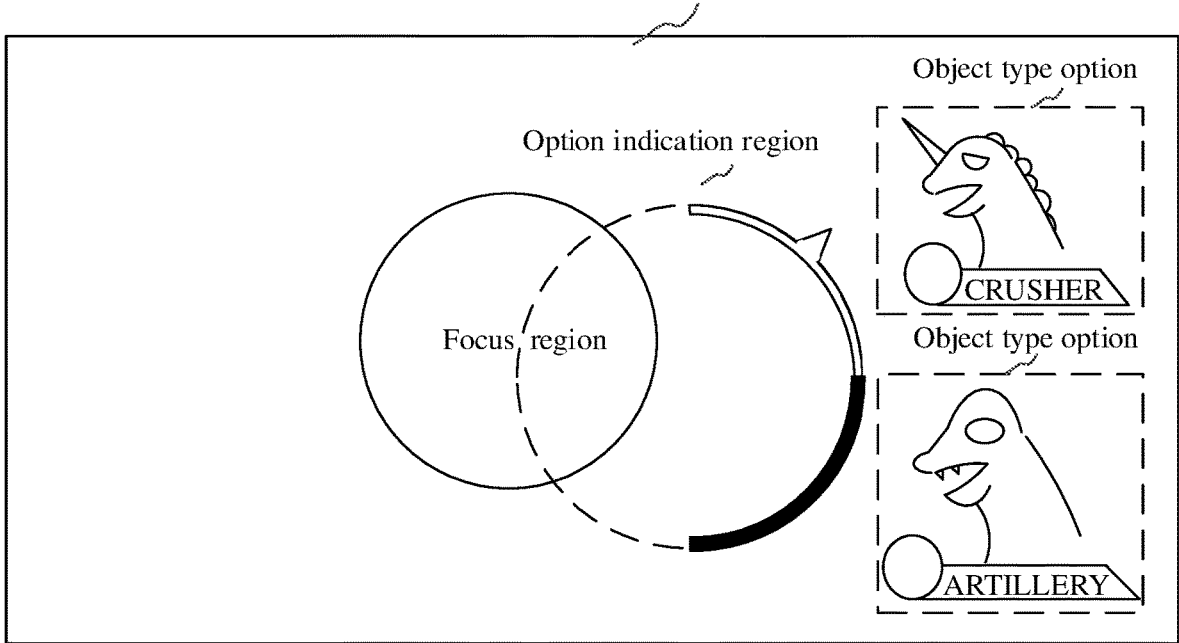
FIG. 10 is a schematic diagram of displaying object type options and an option indication region in some embodiments.

The option indication region is independent of the visual field focus region, that is, no overlapping region exists. Alternatively, the option indication region partially overlaps with the visual field focus region. That is, the option indication region is partially located inside the visual field focus region, and partially located outside the visual field focus region. An area ratio of an area of the overlapping region between the option indication region and the visual field focus region to an area of the visual field focus region may be less than a ratio threshold, which may be preset or set as needed, for example, may be, 1/5. The option indication region may be in any shape, including but not limited to any one of a sector, a semicircle, a rectangle, a circle, an ellipse or a triangle. As shown in FIG. 10, the option indication region is a circular region in a dashed line. As can be seen from the drawing, the position of the center point of the option indication region does not coincide with the position of the center point of the visual field focus region, and the object type option is displayed in the visual field peripheral region.

The option indication flag is used for indicating the object type option selected from each displayed object type option. The option indication flag may be in an arbitrary shape, for example, may be an arc shape. The option indication flag may include an arrow, a direction of which points to the selected object type option. The option indication flag may be, for example, F in FIG. 11. The option indication flag may be displayed in the course of displaying the option indication region, or in response to the option selection event.

Specifically, the terminal may play the conversion animation in response to the conversion operation on the second object, display the object type option in the visual field peripheral region, display the option indication region in a position in the display region deviating from the center point of the visual field focus region, and display the conversion progress indication information and the option indication flag in the option indication region.

In some embodiments, in response to withdrawing the conversion operation, the terminal may cancel playing the conversion animation, and cancel displaying the option indication region and the object type options. Specifically, the display of the object type options and the option indication region is canceled in the course of determining the withdrawal of the conversion operation, and therefore, the display of the object type option, the conversion progress indication information and the option indication flag is canceled. For example, in response to the conversion operation being a long press operation on a key "Q", when the key "Q" is pressed, the object type option is displayed in the visual field peripheral region, the option indication region is displayed in a position in the display region deviating from the center point of the visual field focus region, and the conversion progress indication information and the option indication flag are displayed in the option indication region; and when the key "Q" restores from the pressed state to a non-pressed state, the display of the object type option and the option indication region is canceled. In this embodiment, a function of withdrawing the conversion operation is provided, which improves the interaction efficiency.

In some embodiments, the option indication region includes a progress display region, and the terminal may display the conversion progress indication information in the progress display region.

In some embodiments, the object type options may include an object type option that is selected by default. The terminal may display the option indication flag in the option indication region, the option indication flag indicating the object type option selected by default. The position of the option indication flag in the option indication region may change. For example, the position of the option indication flag in the option indication region changes as the selected object type option changes. In event that the selected object type option remains unchanged, the position of the option indication flag in the option indication region remains unchanged. In event that the selected object type option changes, the position of the option indication flag in the option indication region changes to indicate the selected object type option after the change. For example, when the selected object type option changes from an object type option A selected by default to an object type option B, the position of the option indication flag is updated from the position of the object type option A to pointing to a position where the object type option B needs to be located.

In some embodiments, the option indication flag is displayed while being triggered by the option selection event. Specifically, the terminal may display the option indication region and the object type option in response to a conversion operation on the second object, determine the object type option selected by the option selection event in response to receiving the option selection event, and display the option indication flag, the option indication flag indicating the object type option selected by the option selection event. In a case that the option selection event is received again and the object type option selected by the option selection event received again differs from the currently selected object type option, the selected object type option is updated. That is, the object type option indicated by the option indication flag is updated. For example, the position of the option indication flag may be updated, so that the option indication flag indicates the most recently selected object type option.

In some embodiments, the option indication flag may be displayed while displaying the object type option and selecting the indication region. Specifically, the terminal may display the option indication region and the object type option in response to the conversion operation on the second object, and display the option indication flag in the option indication region, the option indication flag indicating a first object type option in the displayed object type options, the first object type option being the object type option selected by default. The terminal may determine the object type option selected by the option selection event in response to the option selection event, and update the object type option indicated by the option indication flag as the object type option selected by the option selection event. Since the first object type option is selected by default, even if the terminal fails to receive the option selection event, the terminal may also use the first object type option selected by default as an object type of the dependent virtual object, and convert the second virtual object into a virtual object belonging to the object type indicated by the first object type option, which improves the conversion efficiency of the object type. In addition, when the first object type option selected by default is the object type option that the user expects to select, the user does not need to spend time selecting the object type option, which improves the efficiency of human-computer interaction.

In some embodiments, the center point of the option indication region and the object type option are located on the same side of the center point of the visual field focus region; and a distance between the object type option and the center point of the visual field focus region is greater than a distance between the center point of the option indication region and the center point of the visual field focus region. There are countless straight lines passing through the center point of the visual field focus region. The center point of the option indication region and the object type option are located on the same side of the center point of the visual field focus region. It can be understood that the center point of the option indication region and the object type option are located on the same side of a straight line passing through the center point of the visual field focus region. The distance between the object type option and the center point of the visual field focus region is greater than the distance between the center point of the option indication region and the center point of the visual field focus region. Using the straight line that passes through the center point of the visual field focus region being a straight line in a vertical direction (Y-axis) as an example, the center point of the option indication region and the object type option may both be located on the left side of the Y axis or on the right side of the Y axis. In event that the center point of the option indication region and the object type option are both located on the left side of the Y axis, the object type option may be located on the left side of the option indication region; and in event that the center point of the option indication region and the object type option are both located on the right side of the Y axis, the object type option may be located on the right side of the option indication region. For example, the option indication region is a circular region, wherein the center point of the option indication region is located on the right side of a vertical line passing through the center point of the visual field focus region, and the object type option is located on the right side of the option indication region.

In some embodiments, the option indication region may be a region on a roulette in a game scene, and the object type option may be an option on the roulette. In the monster SYNC, the roulette may be referred to as a SYNC roulette. In FIG. 6, the player controls the first object to approach a weak monster and long press a keyboard key "Q", and then the terminal will play an animation of the monster SYNC, that is, "Chip-controlled Animation", and display the SYNC roulette, the SYNC roulette being used to select a type of a monster to be converted. The SYNC roulette may display a text "SYNCING" indicating being in SYNC. The user can move a mouse while long pressing Q. A roulette cursor will follow a movement trajectory of the mouse to select the corresponding monster. After selecting the monster, the user continues to long press Q and wait for the progress to 100%. In response to a progress bar being full, the roulette is turned off automatically. At the same time, the terminal will send a monster selection instruction to the server, and after receiving the instruction, the server will determine a nano monster to be generated according to the instruction, consume a core chip corresponding to this user, and send a corresponding nano monster generation instruction to the terminal. After the terminal receives the generation instruction, a "Chip-controlled Animation" is ended, and the dependent virtual object is displayed in an animation form.

In this embodiment, the option indication region is displayed in a position in the display region deviating from the center point of the visual field focus region, and the conversion progress indication information and the option indication flag are displayed in the option indication region, the option indication flag being used for indicating the selected object type option. Therefore, the option indication region is made to indicate the selected object type option, and may also be located outside the visual field focus region, which reduces the obstruction to the visual field focus region and improves the efficiency of human-computer interaction.

In some embodiments, in response to the selection of the target object type option and the conversion progress indication information indicating the completion of playing of the conversion animation, converting the second object into the dependent virtual object of the first object includes: in response to an option selection event, determining the target object type option selected by the option selection event within a time period during which the conversion animation is played, and pointing the option indication flag to the target object type option; and in response to the conversion progress indication information indicating the completion of playing of the conversion animation, converting the second object into the dependent virtual object of the first object.

Specifically, in response to receiving the option selection event, the terminal may determine the object type option selected by the option selection event within the time period during which the conversion animation is played, determine the selected object type option as the target object type option, and point the option indication flag to the target object type option.

In some embodiments, in response to the conversion progress indication information indicating the completion of playing of the conversion animation, the terminal may cancel displaying the conversion progress indication information and the object type option, determine the object type corresponding to the target object type option to obtain the target object type, generate a target object type, determine the target object type as the dependent virtual object of the first object, and replace the second object with the dependent virtual object.

In this embodiment, in response to the option selection event, the target object type option selected by the option selection event is determined in response to the option selection event, and the option indication flag is pointed to the target object type option. Therefore, the user can intuitively see the selected object type option, which improves the efficiency of human-computer interaction.

In some embodiments, the option indication region includes a prompt information display region. This method further includes: displaying trigger prompt information corresponding to the option selection event in the prompt information display region of the option indication region, the trigger prompt information being used to prompt a triggering mode of the option selection event.

The trigger prompt information may be determined according to an input device configured to trigger the option selection event. The input device is a device configured to trigger the option selection event. There can be many kinds of input devices, and the trigger prompt information corresponding to different input devices may be the same or different. The trigger prompt information may include at least one of information on the input device or an operation mode of the option selection event triggered by the input device.

Specifically, the terminal may receive an operation triggered by the input device, and determine that the option selection event has been received in a case that the triggered operation conforms to the trigger prompt information. The terminal determines the object type option selected by the option selection event in response to the option selection event, and displays the option indication flag, the option indication flag indicating the object type option selected by the option selection event.

In some embodiments, the option indication region may also display a process of indicating that the dependent virtual object is being converted. For example, in FIG. 5, "is being converted" indicates that it is being converted to a user-controllable monster.

In this embodiment, the trigger prompt information corresponding to the option selection event is displayed in the prompt information display region of the option indication region. Because the trigger prompt information is used to prompt a triggering mode of the option selection event, the user quickly grasps the triggering mode of the option selection event, which improves the triggering efficiency of the option selection event, thereby improving the efficiency of human-computer interaction.

In some embodiments, the trigger prompt information includes device information and device operation information, the device information being used to characterize information of the input device, the device operation information being used for indicating the input device to trigger an operation mode of the option selection event, the input device being a device configured to trigger the option selection event. This method further includes: in response to a triggering operation on the input device and the triggering operation conforming to the device operation information, determining the option selection event.

The input device includes, but is not limited to, any one of a mouse, a keyboard, or a gamepad. The device operation information may include the operation mode of the option selection event triggered by the input device, and the operation mode of the option selection event triggered by the input device may be preset or set as required. For example, where the input device is the mouse, the operation mode may include a scrolling operation on a scroll wheel; and where the input device is the gamepad, the operation mode may include a shaking operation on a joystick on the gamepad. For example, in FIG. 11, the selected object type option is an object type option 1108, the object type represented by the object type option 1108 is "CRUSHER", and information 1100 of the input device is a picture of the mouse, the information being used for indicating that the input device is a mouse or keyboard. The device operation information includes up and down arrows of the device information 1100. For the mouse, the up arrow may mean sliding a scroll wheel of the mouse forward, the down arrow may mean sliding the scroll wheel of the mouse backward, or the up arrow may also mean sliding the mouse forward, and the down arrow may also mean sliding the mouse backward. For the keyboard, the up arrow may indicate a press operation on an "upward direction key", and the down arrow may indicate a press operation on a "downward direction key". For example, the device information 1202 in FIG. 12 includes a right (R) joystick of the gamepad, indicating that the input device is the gamepad, in particular the right joystick of the gamepad. The device operation information includes up and down arrows of the device information 1202, wherein the up arrow indicates moving the right joystick of the gamepad upward, and the down arrow indicates moving the right joystick of the gamepad downward.

Specifically, the terminal may receive a triggering operation on the input device, and in response to the triggering operation conforming to the operation mode in the device operation information, determine that the option selection event that conforms to the trigger prompt information has been received. For example, where the input device is the mouse and the operation mode includes the scrolling operation on the scroll wheel of the mouse, the terminal determines that the option selection event that conforms to the trigger prompt information has been received, in response to receiving the scrolling operation on the scroll wheel of the mouse.

In this embodiment, the trigger prompt information includes device information and device operation information. Since the device information is used to characterize information on the input device, the input device is a device configured to trigger the option selection event, and the device operation information is used for indicating the input device to trigger the operation mode of the option selection event, the triggering mode of the option selection event is provided intuitively, the triggering efficiency of the option selection event is promoted, and the efficiency of human-computer interaction is improved.

In some embodiments, the option indication region includes selection regions which are in one-to-one mapping with the displayed object type options. Pointing the option indication flag to the target object type option selected by the option selection event includes: acquiring a position of a selection point for the option selection event; and in response to the position of the selection point being in any of the selection regions, pointing the option indication flag to the object type option mapped by the selection region in the position of the selection point, the object type option mapped by the selection region in the position of the selection point being the target object type option selected by the option selection event.

The option indication region may include one or more selection regions, wherein the number of selection regions is the same as the number of object type options. Each selection regions maps one object type option. For example, there may be two object type options, which are an object type option A and an object type option B. Corresponding selection regions may be set for the object type option A and the object type option B respectively.

Figure 11:
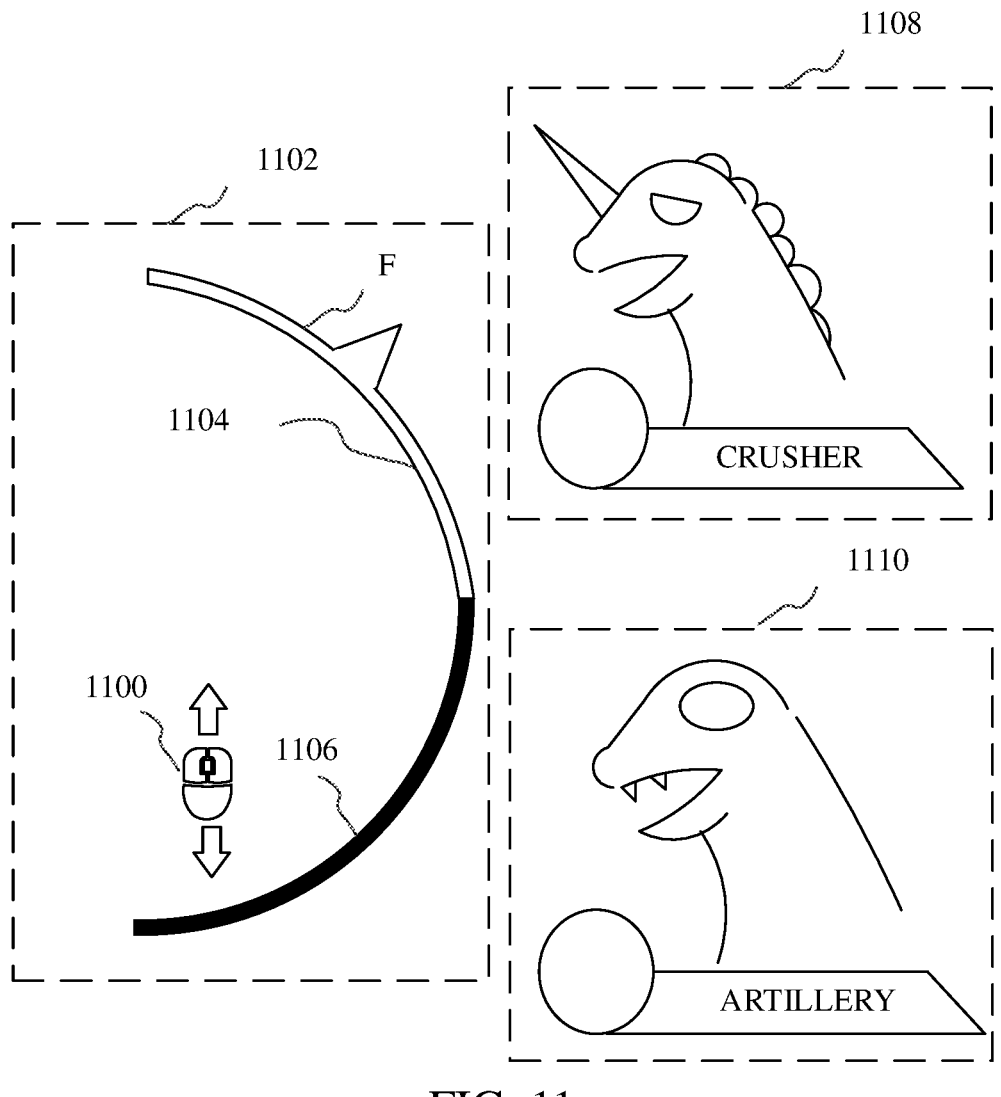
FIG. 11 is a schematic diagram of an option indication region in some embodiments.
Figure 12:
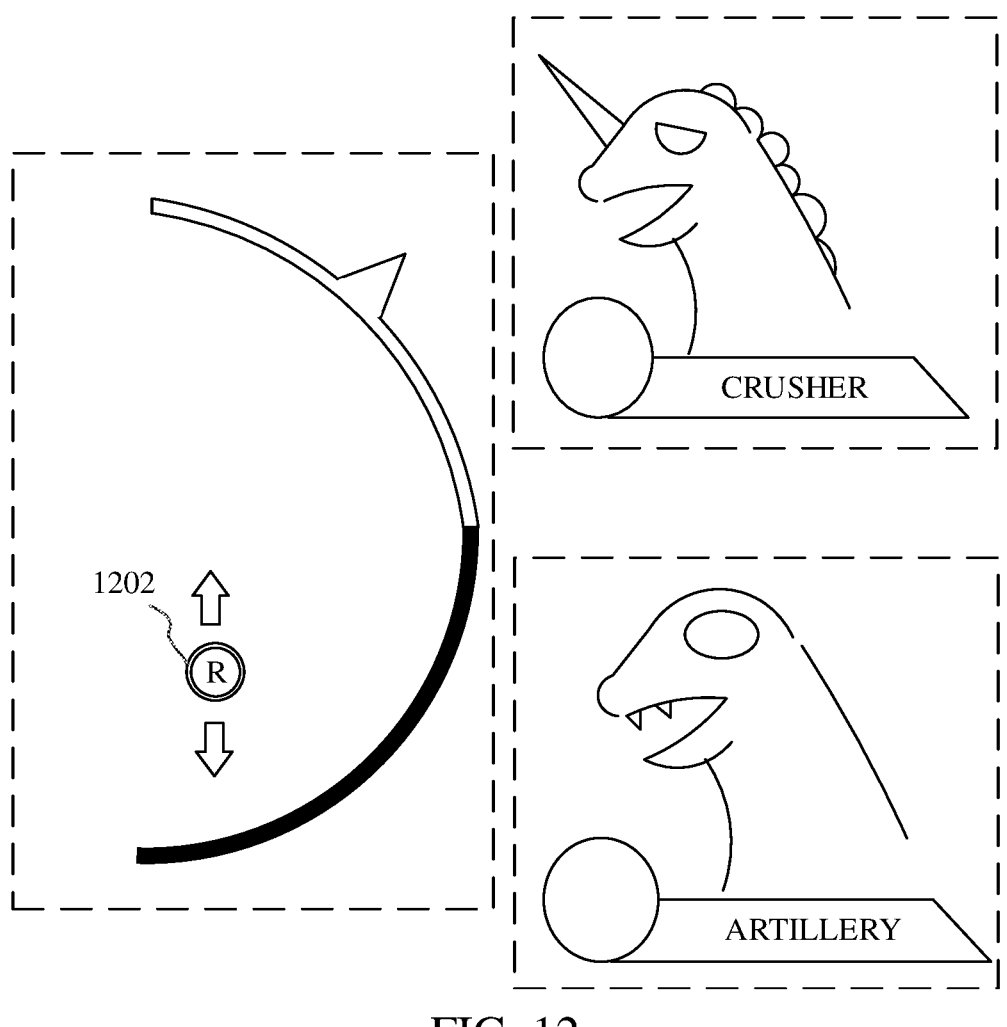
FIG. 12 is a schematic diagram of an option indication region in some embodiments.

The position of the selection point refers to a position focused by the option selection event. For example, in a case that the option selection event is a mouse click event, the position of the selection point is a position clicked by the mouse; and where the option selection event is a scrolling event on the scroll wheel of the mouse, the position of the selection point is a position indicated by the scrolling event. The option selection event may also be a sliding operation, which may be a touch sliding operation or a mouse sliding operation. In response to receiving a sliding operation in the option indication region, the terminal may determine the position of the selection point according to an end point of the sliding operation. For example, the end point of the sliding operation is determined as the position of the selection point. For example, the sliding operation may be an operation of sliding from one option region to another option region, and the option region reached by the sliding operation is an option region where the selection point is located. The option selection event may also be a mouse movement operation. For example, the user can move the mouse while long pressing the key Q, and a roulette cursor can follow the mouse trajectory to select the corresponding monster (i.e., the object type option). As shown in FIG. 11, the option indication region 1102 displays two selection regions, namely a selection region 1104 and a selection region 1106, the option display region corresponding to the selection region 1104 being a region where the object type option 1108 is located, and the option display region corresponding to the selection region 1106 being a region where the object type option 1110 is located. In response to the position of the selection point being in the selection region 1104, the option indication flag points to the object type option 1108; and in response to the position of the selection point being the selection region 1106, the option indication flag points to the object type option 1110. In FIG. 11, the currently selected object type option is the object type option 1108. In response to receiving backward scrolling of the scroll wheel of the mouse, the terminal may determine that the option selection event has been received. In addition, when the selection point is determined to be in the selection region 1106, the terminal may determine the selected object type option 1110 mapped to the selection region 1106 in response to the option selection event, point the option indication flag to the object type option 1110, and display the option indication flag F in the selection region 1106.

Specifically, the terminal may detect the position of the selection point and, in response to determining the position of the selection point being in the selection region, display the option indication flag as the object type option mapped to the selection region. The object type option mapped to the selection region where the selection point is located is the selected object type option.

Figures 13, 14:
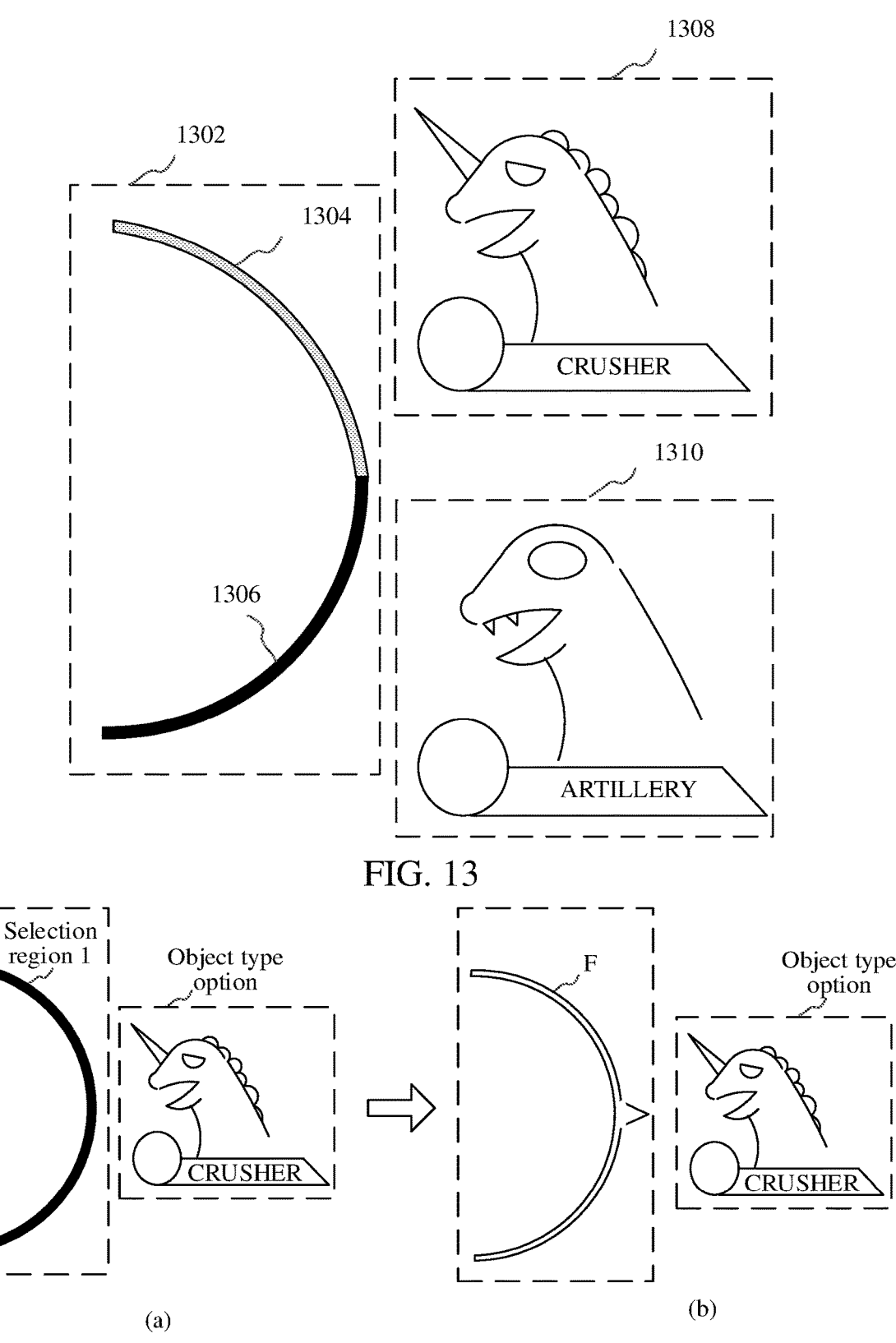
FIG. 13 is a schematic diagram of an option indication region in some embodiments.
FIG. 14 is a schematic diagram of an option indication region in some embodiments.

In some embodiments, each selection region corresponds to an option display region, the option display region being a region used to display the object type option. The terminal may display the object type option mapped to the selection region in the option display region corresponding to this selection region. The option display region is located in the visual field peripheral region. Specifically, the terminal may display the option indication region in a position in the display region deviating from the center point of the visual field focus region in response to the conversion operation on the second object, and display the object type option mapped to the selection region in the option display region corresponding to the selection region in the option indication region. As shown in FIG. 13, the option indication regions 1302 displays two selection regions, namely a selection region 1304 and a selection region 1306, the option display region corresponding to the selection region 1304 being a region where the object type option 1308 is located, and the option display region corresponding to the selection region 1306 being a region where the object type option 1310 is located. In response to the position of the selection point being in the selection region 1304, the option indication flag points to the object type option 1308; and in response to the position of the selection point being the selection region 1306, the option indication flag points to the object type option 1310. There is only one selection region in a case of one object type option. As shown in (a) in FIG. 14, there are only an object type option that characterizes the object type as "CRUSHER" and a selection region 1. In event that the option indication flag is displayed, the option indication flag points to the object type option characterizing the type of the virtual object as "CRUSHER"; and in event that the option indication flag is displayed in the option region 1, the display effect is shown in (b) in FIG. 14, and the option indication flag F is located in the option region 1.

In some embodiments, the option indication flag is displayed in the selection region mapped to the selected object type option. Specifically, the object type options may include an object type option that is selected by default. The terminal may display the option indication flag in the selection region mapped to the object type option that is selected by default. For example, in a case of the object type option 1108 selected by default in FIG. 11, the option indication flag is displayed in the selection region 1104.

Figure 15:
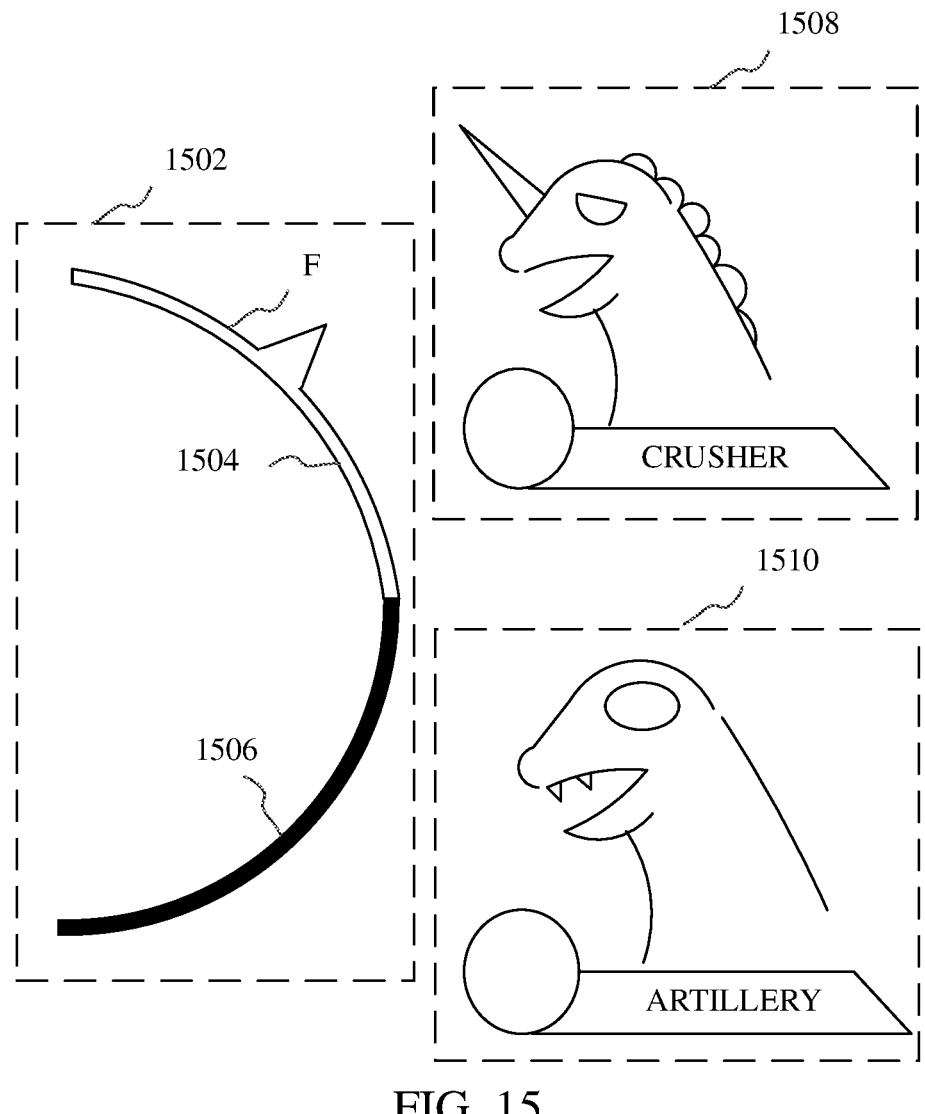
FIG. 15 is a schematic diagram of an option indication region in some embodiments.
Figure 16:
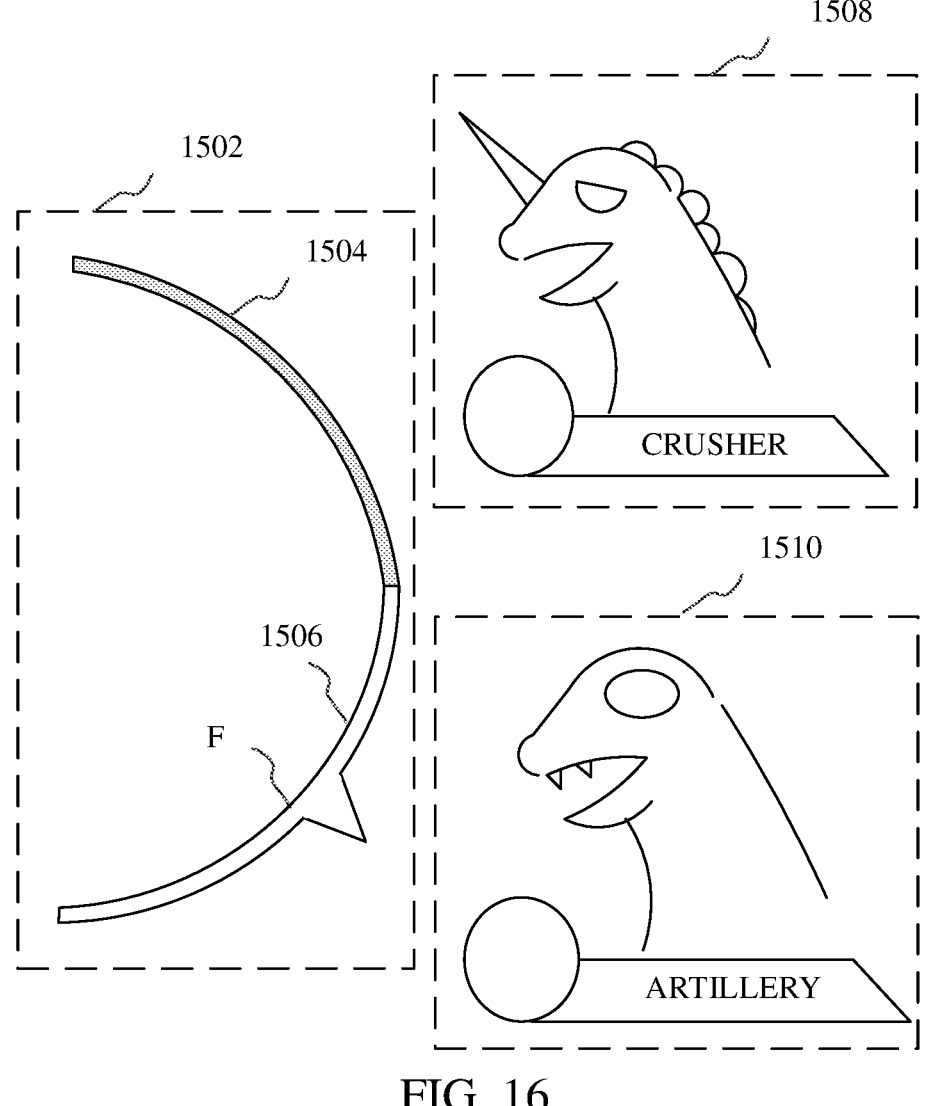
FIG. 16 is a schematic diagram of an option indication region in some embodiments.

In some embodiments, in response to the change in the selected object type option, the position of the option indication flag in the option indication region changes to indicate the selected object type option after the change. As shown in FIG. 15 and FIG. 16, the selected object type option in FIG. 15 is an object type option 1508, and the option indication flag F is displayed in the selection region 1504. In a case that the position of the selection point is located in the selection region 1506, as shown in FIG. 16, the option indication flag F is changed to be displayed in the selection region 1506.

In some embodiments, the option indication region is a circular region, and the selection region is located at the edge of the circular region, for example, at a region on the right edge. The option display region corresponding to the selection region is located near an edge region where the selection region is located. The roulette in this embodiment may be applied to a game. Unlike a common roulette in games, the roulette in this embodiment only has an operation option (such as the option indication flag or object type option) in a right semicircle of a circle, which blocks a screen less and reduces the impact on the player's visual field. As shown in FIG. 10, the option indication region and the object type option are displayed in the display region of the virtual scene. As can be seen from the drawing, the position of the center point of the option indication region deviates from the position of the center point of the visual field focus region (the center point of the display region of the virtual scene is the center point of the visual field focus region). In addition, the object type option is located on the right side and in the visual field peripheral region, without blocking the visual field focus region. The most important region in a shooting game is a centering region in the center of a screen. A roulette in the existing game is usually located in the center of a screen, blocking the player's visual field and affecting the player's shooting. However, the present scheme solves this problem by using a semicircle form to reduce the obstruction of the roulette operation to the visual field.

In this embodiment, the option indication region includes selection regions that are in one-to-one mapping to the displayed object type options. In event that the position of the selection point is in any selection region, the selection indication flag indicates the object type option mapped to the selection region where the selection point is located, so that the object type option can be selected quickly by locating the selection point in the selection region, thereby improving the efficiency of selecting the object type option, and the efficiency of human-computer interaction.

In some embodiments, in response to the conversion operation on the second object, playing the conversion animation and displaying the conversion progress indication information and the object type options include: in response to the conversion operation on the second object, playing the conversion animation, and sending an information acquisition request to a server, the information acquisition request carrying a user ID; in response to the server acquiring the number and types of target virtual resources owned by the first object based on the user ID, receiving the object type option corresponding to the number and types of the target virtual resources returned by the server; and displaying the conversion progress indication information and the returned object type options.

The user identification (ID) may include at least one of a user account number that controls the first object, a name of the first object, the information of the user device configured to control the first object, etc. The conversion progress prompt information may be automatically generated by the terminal, or returned by the server to the terminal in response to an information acquisition request.

Specifically, when the terminal receives the conversion operation on the first object and determines that the first object has target virtual resources, the terminal plays the conversion animation in response to the conversion operation, and sends the information acquisition request to the server. The server extracts the user ID from the information acquisition request in response to the information acquisition request, queries the respective target virtual resources of the first object according to the user ID, determines each object type option based on the object type corresponding to each target virtual resource, and returns the determined object type option to the terminal. For example, in response to receiving a "Chip-controlled Instruction", the terminal may send the information acquisition request to the server. The information acquisition request may include user ID (Identity document) information. In response to receiving the information acquisition request, the server may query the number of core chips of the user according to the user ID information, determine the number of roulette options according to the number of core chips, generate a roulette UI, and send roulette UI information to the terminal. The terminal displays the roulette according to the roulette UI information.

In some embodiments, the number of selection regions may be the same as the number of target virtual resources, and the selection regions including selection regions in one-to-one mapping to the target virtual resources. Since each target virtual resource is used to convert one type of virtual objects, the selection regions include selection regions that are in one-to-one mapping to the object types corresponding to the target virtual resources. Since the object type options are used for indicating the object types, the selection regions include selection regions that are in one-to-one mapping to the object type options corresponding to the target virtual resources.

In this embodiment, in response to the conversion operation on the first object, the information acquisition request is sent to the server, so that the server acquires the target virtual resources of the first object, and determines the object type option according to the target virtual resources of the first object. Since the number of the target virtual resources is determined by the server, the security in the number of the target virtual resources is improved, and the occurrence of tampering with the number of the target virtual resources is reduced, thereby improving the security.

In some embodiments, the method further includes: stopping responding to the control operation on the first object within a time period during which the conversion animation is played.

The control operation is used to trigger the first object to execute the corresponding behaviors, and different control operations are used to trigger the execution of different behaviors. The behaviors include, but are not limited to, at least one of shooting, moving, jumping, and the like. The control operations include, but are not limited to, an operation on keys on the keyboard, a mouse operation, etc.

Specifically, within a time period during which the conversion animation is played, the terminal stops responding to the control operation on the first object. In response to the completion of playing of the conversion animation, the terminal may respond to the control operation in response to receiving the control operation on the first object, and control the first object to perform the behavior indicated by the control operation.

In some embodiments, the terminal plays the conversion animation in response to the conversion operation on the second object, display the object type option in the visual field peripheral region in the process of playing the conversion animation, and display the option indication region in a position in the display region deviating from the center point of the visual field focus region. For example, as shown in FIG. 5, an object type option and an option indication region are displayed while playing the conversion animation, wherein the option indication region displays an option indication flag, and small squares and the first object in the drawing are the content in the conversion animation.

In some embodiments, the terminal may play the conversion animation in a region other than the display region of the virtual scene, or may play the conversion animation in the display region of the virtual scene. The terminal may cancel the display of a screen in the virtual scene, play the conversion animation, or display the screen in the virtual scene while playing the conversion animation.

In this embodiment, the response to the control operation on the first object is stopped within the time period during which the conversion animation is played, which can reduce inaccurate control on the first object and improve the accuracy of controlling the first object.

In some embodiments, the method further includes: in response to an animation termination instruction, terminating playing the conversion animation, and canceling displaying the conversion progress indication information and the object type options, within the time period during which the conversion animation is played.

The animation termination instruction is used to trigger the termination of playing of the conversion animation. The termination of playing of the conversion animation is different from the completion of playing of the conversion animation. In a case of the termination of playing of the conversion animation, the playing of the conversion animation has not completed, that is, a part of the conversion animation has only played, and but the remaining part has not been played.

The animation termination instruction may be triggered by a device of the terminal itself, such as a keyboard, or by a device that communicates with the terminal, for example, by a mouse, or by a keyboard connected to the terminal in a wired manner, for example, by a press operation on a key on the keyboard.

Specifically, in response to the conversion operation on the first object, the terminal plays the conversion animation. Within the time period during which the conversion animation is played, the terminal terminates playing the conversion animation in response to receiving the animation termination instruction, and cancels displaying the conversion progress indication information and the object type options.

In some embodiments, within the time period during which the conversion animation is played, the terminal stops the conversion process in response to receiving the animation termination instruction. That is, the steps of converting the second object into the dependent virtual object of the first object will not be performed.

In this embodiment, since the response to the control operation on the first object is stopped within the time period during which the conversion animation is played, the user is idle within the time period during which the conversion animation is played. Therefore, the object type option is selected within the time period during which the conversion animation is played, which can make full use of the time period during which the conversion animation is played and improve the time utilization rate, thereby improving the efficiency of human-computer interaction.

In some embodiments, playing the conversion animation includes: playing the conversion animation in the display region of the virtual scene, a screen of the virtual scene displayed in the display region being a background screen of the conversion animation; and in response to a display updating instruction for the screen of the virtual scene, updating the display of the screen of the virtual scene displayed in the display region, within the time period during which the conversion animation is played.

The display updating instruction is used to trigger the update of the screen of the displayed virtual scene, that is, refresh the display of the screen of the displayed virtual scene.

Specifically, the terminal may play the conversion animation in the display region of the virtual scene by taking the screen of the displayed virtual scene as a background screen, and update the display of the screen of the displayed virtual scene in real time.

In some embodiments, the virtual scene may also include a PK object corresponding to the first object. The PK object may be a virtual object controlled by a computer or a user.

When the PK object is a virtual object controlled by the user, the user who controls the first object is different from the user who controls the PK object, and there is a PK relationship between the first object and the corresponding PK object. For example, the first object is controlled by a user A through a user A's device, and the PK object is controlled by a user B through a user B's device. The first object may fight against the PK object by performing a PK behavior, and of course, the PK object may also fight against the first object by performing a PK behavior. The PK behaviors include, but are not limited to, shooting. The first object and the PK object, for example, may be virtual characters controlled by different players in the game through user's devices.

In some embodiments, within a time period during which the conversion animation is played, the terminal stops responding to a PK triggering operation on the first object. In response to the completion of playing of the conversion animation, the terminal may respond to the PK triggering operation upon receiving the PK triggering operation on the first object, and control the first object to perform the PK behavior corresponding to the PK triggering operation in response to the PK triggering operation. The PK triggering operation is an operation that triggers the first object to perform the PK behavior.

In some embodiments, the conversion operation is triggered based on the user device corresponding to the first object, and the animation termination instruction may be triggered by the user device corresponding to the first object. In the course of playing the conversion animation, the screen of the virtual scene is updated in real time, which can provide convenience for determining the position of the PK object within the time period during which the conversion animation is played, and timely control the first object to perform the PK behavior on the PK object. For example, within the time period during which the conversion animation is played, in a case that the PK object appears in the visual field focus region, the terminal stops responding to the control operation on the first object within the time period during which the conversion animation is played. Therefore, the terminal stops responding to the PK triggering operation on the first object, so that the user can trigger the animation termination instruction through the user device within the time period during which the conversion animation is played, and then the terminal can respond to the animation termination instruction to terminate the playing of the conversion animation. Accordingly, the terminal can respond to the PK triggering operation for the first object, so as to respond to the PK triggering operation in time, and control the first object to perform the PK behavior, thereby improving the efficiency of controlling the first object, as well as the smoothness and efficiency of human-computer interaction, and saving computer resources. In a case that the virtual scene includes a collaborative object of the first object, the terminal controls a terminal of the user of the first object to play the conversion animation in response to receiving the conversion operation for the first object triggered by the device corresponding to the first object. In the course of playing the conversion animation, if the screen of the virtual scene is used as a background, the movement of the collaborative object can be observed when playing the conversion animation. In response to the PK object being included in the virtual scene, the movement of the PK object can be observed.

In this embodiment, the conversion animation is played in the display region of the virtual scene, and the screen of the virtual scene is a background screen of the conversion animation. In addition, the screen of the virtual scene is updated in real time, so that the situation in the virtual scene can also be understood while the conversion animation is played. For example, the position of the first object and the position of the PK object can be grasped in time, so as to control the first object to perform the corresponding behaviors in time, for example, facilitate the user to determine the position of the PK object in advance to immediately perform the PK behavior to the PK object, thereby improving the efficiency of human-computer interaction. Moreover, in this embodiment, since the object type option is displayed in the visual field peripheral region, the option indication region is displayed in a position in the display region deviating from the center point of the visual field focus region, thereby reducing the obstruction to the visual field focus region in the process of playing the conversion animation, in order to accurately grasp the situation in the virtual scene. Therefore, the first object is controlled to perform the behavior instantaneously, thereby improving the efficiency of human-computer interaction and saving the computer resources.

In some embodiments, the method further includes: in response to the completion of playing of the conversion animation, displaying the dependent virtual object of the first object in an animation form.

Specifically, the terminal may play the conversion animation in response to the conversion operation on the virtual object; display the object type option and the option indication region; in response to the option selection event, determine the object type indicated by the selected object type option as a target object type upon the termination (i.e., completion) of playing of the conversion animation within a time period duration which the conversion animation is played; generate a virtual object belonging to the target object type; and convert the second object into the generated virtual object, so that the second object is converted into the dependent virtual object of the first object.

In some embodiments, in response to the completion of playing of the conversion animation, the dependent virtual object of the first object is displayed in an animation form. For example, the dependent virtual object may be displayed from a posing animation of the dependent virtual object.

In this embodiment, in response to the completion of playing of the conversion animation, the dependent virtual object of the first object is displayed in the animation form, so that the dependent virtual object is displayed in the animation form, so as to prompt a successful generation of the dependent virtual object in the animation form, thereby improving the efficiency of human-computer interaction.

In some embodiments, the response to the conversion operation on the second object includes: receiving the conversion operation on the second object, and responding to the conversion operation on the second object in response to determining that a virtual backpack of the first object includes the target virtual resources.

Specifically, in response to the attribute value of the second object being less than the preset threshold, the terminal displays conversion prompt information. In event that the attribute value of the second object is less than the preset threshold, the terminal determines whether the virtual backpack of the first object includes the target virtual resources in response to the terminal receiving the conversion operation of the first object for the second object, and responds to the conversion operation on the second object in response to determining that the virtual backpack of the first object includes the target virtual resources. In response to determining that the virtual backpack of the first object does not include the target virtual resources, the response on the conversion operation of the second object is rejected.

In an embodiment of this application, in response to determining that the virtual backpack of the first object includes the target virtual resources, the conversion operation on the second object can be responded, thereby reducing ineffective responses and saving the computer resources.

Figure 17A:
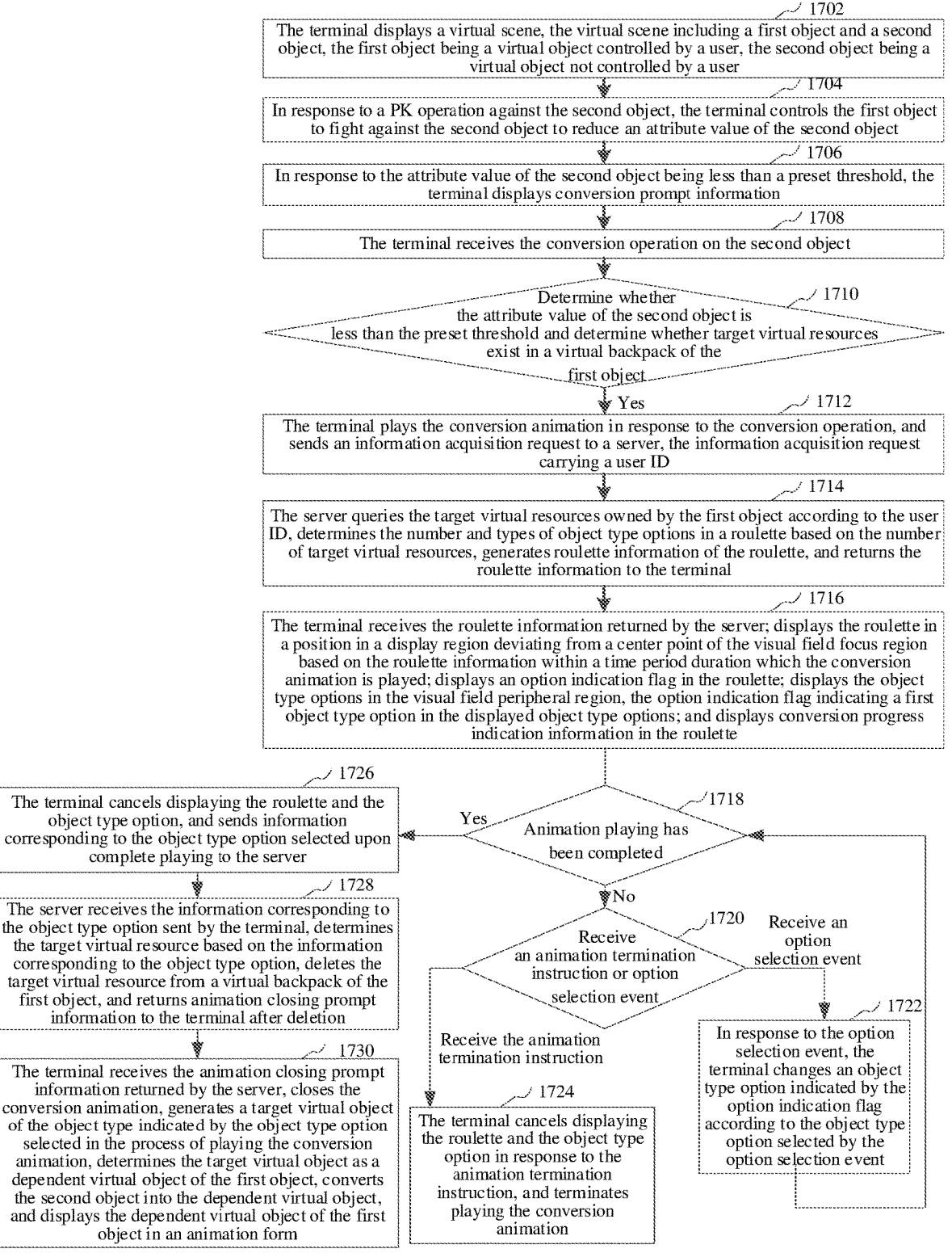
FIG. 17A is a schematic flowchart of a virtual object control method in some embodiments.

This application also provides an application scene, which is applicable to the virtual object control method described above. This scene is a scene that converts the type of the virtual object, an option indication region in this scene may be a region on a roulette in a game, and an object type option may be an option on the roulette, specifically: as shown in FIG. 17A, the application of the virtual object control method in this application scene is as follows.

Step 1702: The terminal displays a virtual scene, the virtual scene including a first object and a second object, the first object being a virtual object controlled by a user, the second object being a virtual object not controlled by a user.

A display region of the virtual scene includes a visual field focus region and a visual field peripheral region other than the visual field focus region. The virtual scene may be a scene in a shooting game.

Step 1704: In response to a PK operation against the second object, the terminal controls the first object to fight against the second object to reduce an attribute value of the second object.

Step 1706: In response to the attribute value of the second object being less than a preset threshold, the terminal displays conversion prompt information.

Step 1708: The terminal receives the conversion operation on the second object.

The conversion operation is triggered by a device of a user who controls the first object.

Step 1710: The terminal determines whether the attribute value of the second object is less than the preset threshold and determines whether target virtual resources exist in the virtual backpack of the first object, and performs Step 1712 in response to determining that the attribute value of the second object is less than the preset threshold and the target virtual resources exist in the virtual backpack.

Step 1712: The terminal plays the conversion animation in response to the conversion operation, and sends an information acquisition request to a server. The information acquisition request carries a user ID.

The terminal stops responding to a control operation on the first object in the process of playing the conversion animation. The user ID is an identity of the user who controls the first object, for example, may be a user's game account.

Step 1714: The server queries the target virtual resources owned by the first object according to the user ID, determines the number and types of object type options in a roulette based on the number of target virtual resources, generates roulette information of the roulette, and returns the roulette information to the terminal.

The roulette information may be, for example, UI information of the roulette. The roulette information may include the number of object type options and the object types indicated by the object type options, as well as a position of an option indication flag in the roulette, and an object type option indicated by the option indication flag by default.

Step 1716: The terminal receives the roulette information returned by the server; displays the roulette in a position in a display region deviating from a center point of the visual field focus region based on the roulette information within a time period duration which the conversion animation is played; displays an option indication flag in the roulette; displays the object type options in the visual field peripheral region, the option indication flag indicating a first object type option in the displayed object type options; and displays conversion progress indication information in the roulette.

Step 1718: The terminal determines whether the conversion progress indication information characterizes the completion of playing of the conversion animation, and if so, the process proceeds to Step 1726. If not, Step 1720 is performed.

Step 1720: Whether the terminal receives an option selection event and whether the terminal receives an animation termination instruction are determined within the time period duration which the conversion animation is played; Step 1722 is performed in response to receiving the option selection event; and Step 1724 is performed in response to receiving the animation termination instruction.

Step 1722: In response to the option selection event, the terminal changes an object type option indicated by the option indication flag according to the object type option selected by the option selection event.

Step 1724: In response to the animation termination instruction, the terminal cancels displaying the roulette and the object type option, and terminates the playing of the conversion animation.

Step 1726: The terminal cancels displaying the roulette and the object type option, and sends information corresponding to the object type option selected upon complete playing to the server.

The information corresponding to the object type option includes, but is not limited to, an identifier of the target virtual resource corresponding to the object type option or an identifier of an object type represented by the object type option.

Step 1728: The server receives the information corresponding to the object type option sent by the terminal, determines the target virtual resources based on the information corresponding to the object type option, deletes the target virtual resources from a virtual backpack of the first object, and returns animation closing prompt information to the terminal after deletion.

The animation closing prompt information is used to instruct the terminal to close the conversion animation. The playing of the conversion animation has been completed in response to closing the conversion animation.

Step 1730: The terminal receives the animation closing prompt information returned by the server, closes the conversion animation, generates a target virtual object of the object type indicated by the object type option selected in the process of playing the conversion animation, determines the target virtual object as a dependent virtual object of the first object, converts the second object into the dependent virtual object, and displays the dependent virtual object of the first object in an animation form.

Figure 17B:
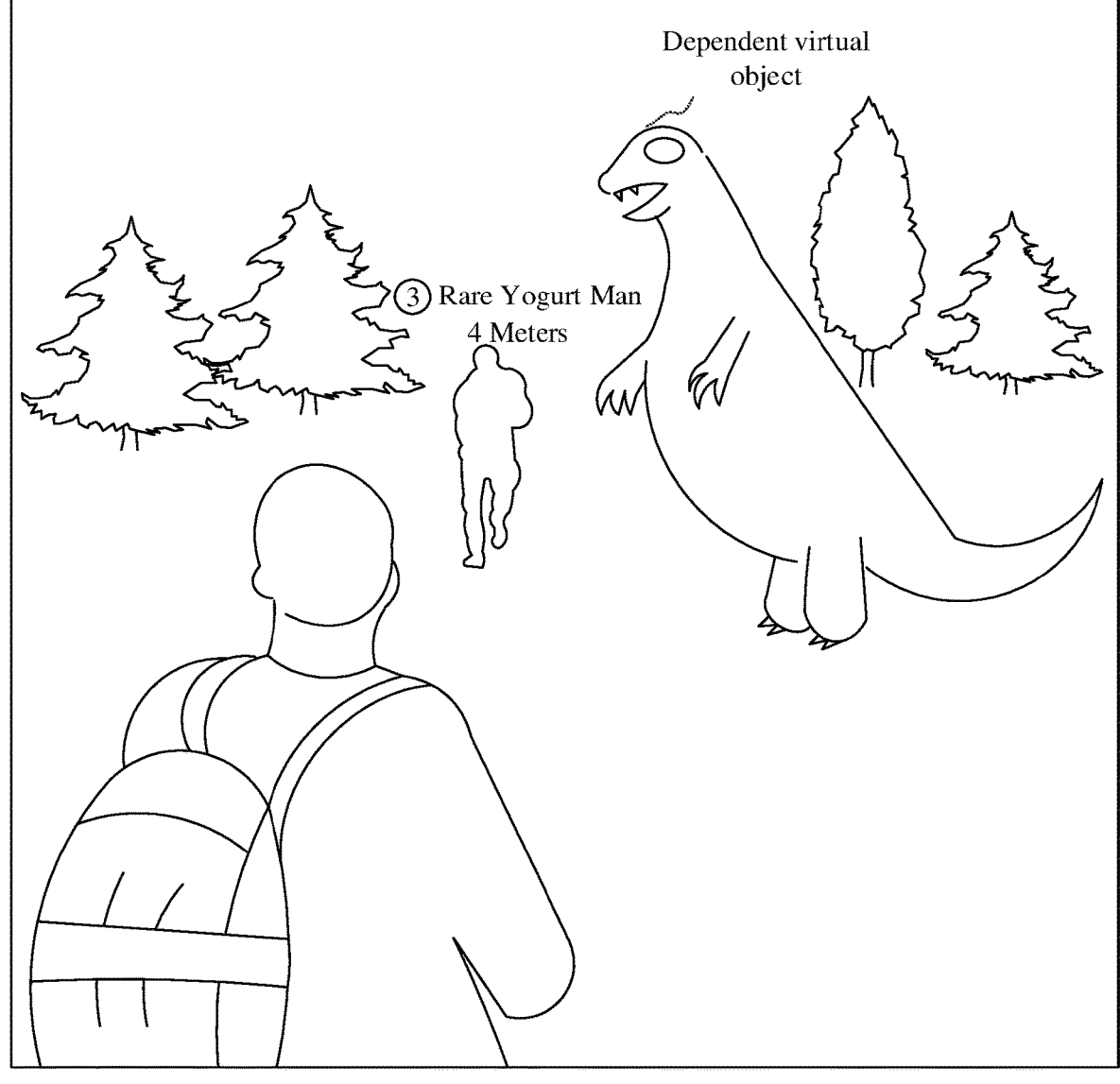
FIG. 17B is a schematic diagram of a screen of a virtual scene in some embodiments.

As shown in FIG. 17B, the dependent virtual object of the first object is shown.

In this embodiment, within the time period during which the conversion animation is played, the terminal stops responding to a control operation on the first object, and thus displays the roulette and the object type options in response to the control operation on the first object. Therefore, the time period during which the conversion animation is played becomes a time period for freely selecting the object type option, thereby making full use of the time, and reducing the obstruction to the user's visual field by the option indication region and the object type option in other time periods. In addition, in a game such as a shooting game, a small region in the middle of a screen is referred to as a focus region. The player's attention in the game mainly focuses on this region, so the focus region should minimize the interference of an UI to a player. Usually in some games, the roulette UI may obscure the player's visual field in the focus region. In this embodiment, the option indication region is displayed in a position in the display region deviating from the center point of the visual field focus region, and the object type options are displayed in the visual field peripheral region. This design does not obscure the focus region with options (i.e., object type options) on the roulette, and also allows the player to notice the presence of the roulette, thereby reducing the obstruction of the player's visual field. The object type options and the obscuration of the object type options to the visual field in the time period during which the conversion animation is displayed are reduced, so that the user can observe a screen in the virtual scene and grasp the situation in the virtual scene, thereby providing sufficient and accurate conditions for controlling the first object upon the termination of the animation, improving the efficiency of controlling the first object and the efficiency of human-computer interaction, and saving the computer resources.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this application, execution of the steps is not strictly limited, and the steps may be performed in other sequences. Moreover, at least some of the steps in the flowchart involved in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 18:
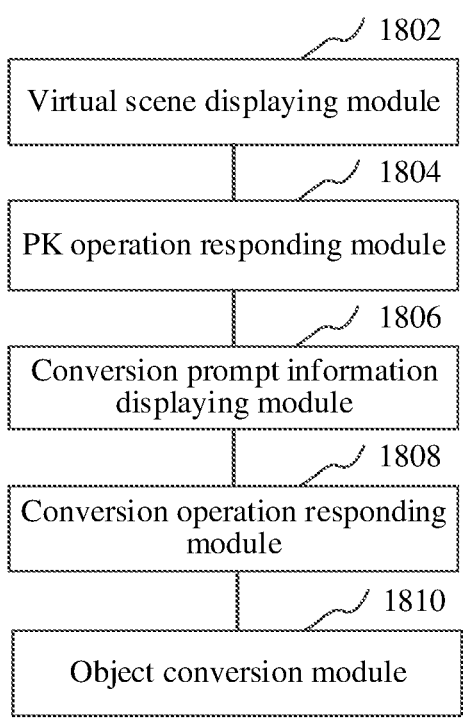
FIG. 18 is a structural block diagram of a virtual object control apparatus in some embodiments.

In some embodiments, as shown in FIG. 18, a virtual object control apparatus is provided. The apparatus may be integrated into a part of a computer device by employing a software module or a hardware module, or a combination of the two. The apparatus specifically includes: a virtual scene displaying module 1802, a PK operation responding module 1804, a conversion prompt information displaying module 1806, a conversion operation responding module 1808 and an object conversion module 1810, wherein: the virtual scene displaying module 1802 is configured to display a virtual scene, the virtual scene including a first object and a second object, the first object being a virtual object controlled by a user, the second object being a virtual object not controlled by a user; the PK operation responding module 1804 is configured to, in response to a PK operation against the second object, control the first object to fight against the second object to reduce an attribute value of the second object; the conversion prompt information displaying module 1806 is configured to, in response to the attribute value of the second object being less than a preset threshold, display conversion prompt information; the conversion operation responding module 1808 is configured to, in response to a conversion operation on the second object, play a conversion animation, and display conversion progress indication information and object type options; and the object conversion module 1810 is configured to, in response to the selection of a target object type option and the conversion progress indication information indicating the completion of playing of the conversion animation, convert the second object into a dependent virtual object of the first object, the target object type option being one of the displayed object type options, an object type to which the dependent virtual object belongs being an object type indicated by the target object type option.

In some embodiments, a display region of the virtual scene includes a visual field focus region and a visual field peripheral region other than the visual field focus region. The visual field focus region is a region focused by a user's sight line within a preset range centered on a center point of the display region. The object type option is displayed in the visual field peripheral region.

In some embodiments, the conversion operation responding module is further configured to: display an option indication region in a position deviating from the center point of the visual field focus region, and display the object type options in the visual field peripheral region; and display the conversion progress indication information and an option indication flag in the option indication region, the option indication flag being used for indicating the selected object type option.

In some embodiments, the object conversion module is further configured to: in response to an option selection event, determine the target object type option selected by the option selection event within a time period during which the conversion animation is played, and point the option indication flag to the target object type option; and in response to the conversion progress indication information indicating the completion of playing of the conversion animation, convert the second object into the dependent virtual object of the first object.

In some embodiments, the option indication region includes a prompt information display region. The apparatus is further configured to: display trigger prompt information corresponding to the option selection event in the prompt information display region of the option indication region, the trigger prompt information being used to prompt a triggering mode of the option selection event.

In some embodiments, the trigger prompt information includes device information and device operation information, the device information being used to characterize information of the input device, the device operation information being used for indicating the input device to trigger an operation mode of the option selection event, the input device being a device configured to trigger the option selection event. The apparatus is further configured to: in response to a triggering operation on the input device and the triggering operation conforming to the device operation information, determine the option selection event.

In some embodiments, the option indication region includes selection regions which are in one-to-one mapping with the displayed object type options. The object conversion module is further configured to: acquire a position of a selection point for the option selection event; and in response to the position of the selection point being in any of the selection regions, pointing the option indication flag to the object type option mapped by the selection region in the position of the selection point, the object type option mapped by the selection region in the position of the selection point being the target object type option selected by the option selection event.

In some embodiments, the virtual object control apparatus is further configured to: in response to withdrawing the conversion operation, cancel playing the conversion animation, and cancel displaying the option indication region and the object type options, In some embodiments, the conversion operation responding module is further configured to: in response to the conversion operation on the second object, play the conversion animation, and send an information acquisition request to a server, the information acquisition request carrying a user ID; in response to the server acquiring the number and types of target virtual resources owned by the first object based on the user ID, receive the object type option corresponding to the number and types of the target virtual resources returned by the server; and display the conversion progress indication information and the returned object type options.

In some embodiments, the apparatus is further configured to: stop responding to the control operation on the first object within a time period during which the conversion animation is played.

In some embodiments, the apparatus is further configured to: in response to an animation termination instruction, terminate playing the conversion animation, and cancel displaying the conversion progress indication information and the object type options, within the time period during which the conversion animation is played.

In some embodiments, the conversion operation responding module is further configured to: play the conversion animation in the display region of the virtual scene, a screen of the virtual scene displayed in the display region being a background screen of the conversion animation; and in response to a display updating instruction for the screen of the virtual scene, update the display of the screen of the virtual scene displayed in the display region, within the time period during which the conversion animation is played.

In some embodiments, the apparatus is further configured to: in response to the completion of playing of the conversion animation, display the dependent virtual object of the first object in an animation form.

In some embodiments, the conversion operation responding module is further configured to: receive the conversion operation on the second object, and respond to the conversion operation on the second object in response to determining that a virtual backpack of the first object includes the target virtual resources.

The specific restrictions on the virtual object control apparatus can be found in the above restrictions on the virtual object control method, which will not be repeated here. The respective modules in the virtual object control apparatus may be implemented entirely or partially through software, hardware, or a combination thereof. The above modules may be embedded in a hardware form or independent of a processor in a computer device, or stored in a memory of the computer device in a software form, allowing the processor to call to perform the corresponding operations of the above modules.

In some embodiments, a computer device is provided. The computer device may be a terminal, an internal structure diagram of which may be shown in FIG. 19. The computer device includes a processor, a memory, a communication interface, a display screen and an input apparatus that are connected by using a system bus. The processor of the computer device is configured to provide computation and control ability. The memory of the computer device includes a non-volatile storage medium and an internal memory. The non-volatile storage medium stores an operating system and computer-readable instructions therein. The internal memory provides an environment for the operating system and the computer-readable instructions in the non-volatile storage medium. The communication interface of the computer device is configured to communicate with an external terminal in a wired or wireless manner, and the wireless manner can be implemented by WIFI, an operator network, near field communication (NFC) or other technologies. The computer-readable instructions are executed by the process to implement a virtual object control method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

In some embodiments, a computer device is provided. The computer device may be a server, an internal structural diagram of which may be shown in FIG. 20. The computer device includes a processor, a memory, and a network interface that are connected by using a system bus. The processor of the computer device is configured to provide computation and control ability. The memory of the computer device includes a non-volatile storage medium and an internal memory. The non-volatile storage medium stores an operating system, and further stores computer-readable instructions. The internal memory provides an environment for the operating system and the computer-readable instructions in the non-volatile storage medium. A database of the computer device is used to store data involved in the virtual object control method. The network interface of the computer device is configured to connect to and communicate with an external terminal by using a network. The computer-readable instructions are executed by the process to implement a virtual object control method.

Figure 19:
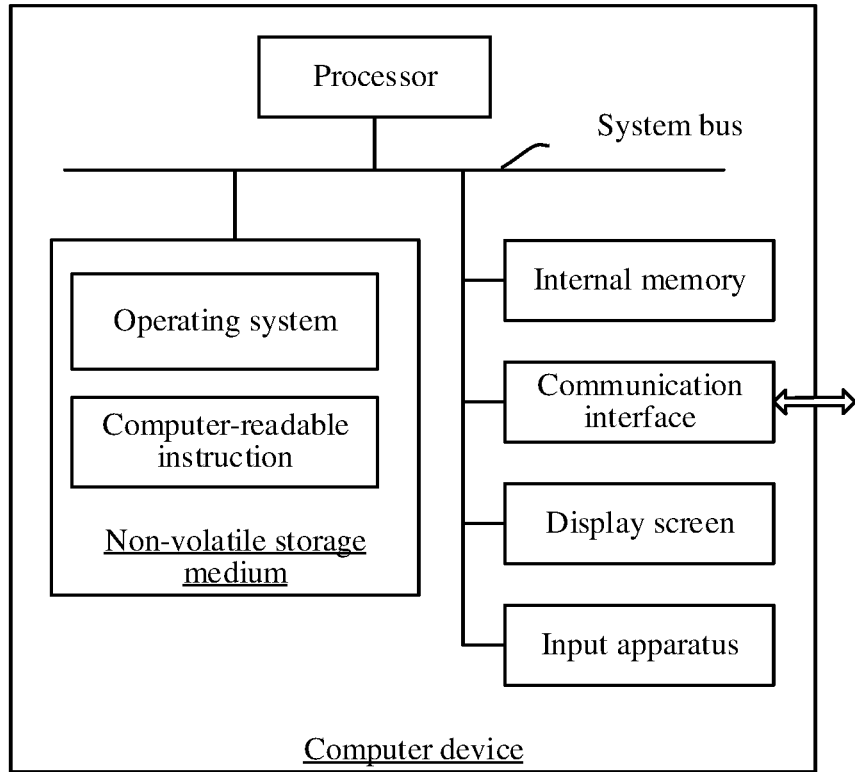
FIG. 19 is an internal structural diagram of a computer device in some embodiments.
Figure 20:
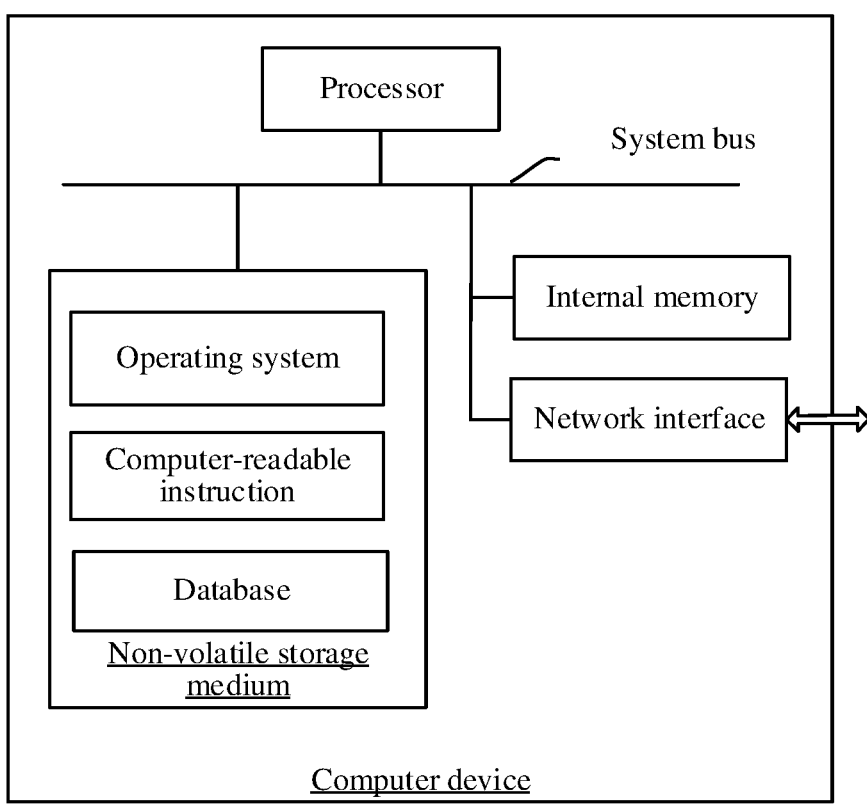
FIG. 20 is an internal structural diagram of a computer device in some embodiments.

A person skilled in the art may understand that, the structure shown in FIG. 19 and FIG. 20 is merely a block diagram of a partial structure related to a solution in this application, and does not constitute a limitation to the computer device to which the solution in this application is applied. Specifically, the computer device may include more or fewer components than those shown in the figure, or have some components combined, or have a different component deployment.

In some embodiments, a computer device is further provided, including: a memory and one or more processors, the memory storing computer-readable instructions therein. The computer-readable instructions, when executed by the processor, cause the one or more processors to perform the steps in the above method embodiments.

In some embodiments, one or more non-volatile readable storage mediums are provided, which are configured to store computer-readable instructions. The computer-readable instructions, when executed by one or more processors, cause the one or more processors to perform the steps in the above method embodiments.

In some embodiments, a computer program product is provided, including computer-readable instructions. The computer-readable instructions, when executed by a processor, perform the steps in the above method embodiments.

A person of ordinary skill in the art may understand that all or some of procedures of the method in the foregoing embodiments may be implemented by a computer-readable instruction instructing relevant hardware. The computer-readable instruction may be stored in a non-volatile computer-readable storage medium. When the computer-readable instruction is executed, the procedures of the foregoing method embodiments may be implemented. References to the memory, the storage, the database, or other medium used in the embodiments provided in this application may all include at least one a non-volatile memory or a volatile memory. The non-volatile memory may include, for example, a read only memory (ROM), a magnetic tape, a floppy disk, a flash memory, or an optical memory, etc. The volatile memory may be a random access memory (RAM) or an external cache. As a description rather than a limitation, RAM can be implemented in many forms, such as a static random access memory (SRAM) or a dynamic random access memory (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. A virtual object control method, performed by a processor executing instructions from a memory, the method comprising:

displaying a virtual scene on a display screen, the virtual scene comprising a first object, a second object, a visual field focus region, and a visual field peripheral region, the first object being a virtual object controlled by a user, the second object being a virtual object not controlled by a user;

in response to an operation against the second object, controlling the first object to fight against the second object in the virtual scene to reduce an attribute value of the second object;

in response to the attribute value of the second object being less than a preset threshold, displaying conversion prompt information on the display screen;

in response to a conversion operation on the second object, playing a conversion animation, and displaying conversion progress indication information and object type options on the display screen, by:

displaying an option indication region in a position in a display region deviating from a center point of the visual field focus region, and displaying the object type options in the visual field peripheral region; and displaying the conversion progress indication information and an option indication flag in the option indication region, the option indication flag used to indicate a target object type option being selected; and in response to a selection of the target object type option and the conversion progress indication information indicating a completion of playing of the conversion animation, converting the second object into a dependent virtual object of the first object, the target object type option being one of the object type options, an object type to which the dependent virtual object belongs being an object type indicated by the target object type option.

2. The method according to claim 1, wherein a number of the object type options and object types indicated by the object type options are determined according to the number and types of target virtual resources in a virtual backpack of the first object.

3. The method according to claim 1, wherein the visual field peripheral region is different than the visual field focus region; the visual field focus region is a region focused by a user's sight line within a preset range centered on the center point of the display region; and the object type options are displayed in the visual field peripheral region.

4. The method according to claim 1, wherein converting the second object into a dependent virtual object of the first object in response to the selection of the target object type option and the conversion progress indication information indicating the completion of playing of the conversion animation comprises:

in response to an option selection event, determining the target object type option selected by the option selection event within a time period during which the conversion animation is played, and pointing the option indication flag to the target object type option; and in response to the conversion progress indication information indicating the completion of playing of the conversion animation, converting the second object into the dependent virtual object of the first object.

5. The method according to claim 4, wherein the option indication region comprises a prompt information display region, and the method further comprises:

displaying trigger prompt information corresponding to the option selection event in the prompt information display region of the option indication region, the trigger prompt information being configured to prompt a triggering mode of the option selection event.

6. The method according to claim 5, wherein the trigger prompt information comprises device information and device operation information, the device information configured to characterize information of an input device, the device operation information used to indicate the input device to trigger an operation mode of the option selection event; the input device configured to trigger the option selection event; and the method further comprises:

in response to a triggering operation on the input device and the triggering operation conforming to the device operation information, determining the option selection event.

7. The method according to claim 4, wherein the option indication region comprises selection regions which are in one-to-one mapping with the object type options being displayed; and pointing the option indication flag to the target object type option comprises:

acquiring a position of a selection point for the option selection event; and in response to the position of the selection point being in one of the selection regions, pointing the option indication flag to an object type option mapped by the selection region in the position of the selection point, the object type option mapped by the selection region in the position of the selection point being the target object type option selected by the option selection event.

8. The method according to claim 1, further comprising:

in response to withdrawing the conversion operation, canceling playing the conversion animation, and canceling displaying the option indication region and the object type options.

9. The method according to claim 1, wherein a number of the object type options and object types indicated by the object type options are determined according to the number and types of target virtual resources in a virtual backpack of the first object.

10. The method according to claim 1, wherein playing the conversion animation, and displaying the conversion progress indication information and the object type options in response to the conversion operation on the second object comprises:

in response to the conversion operation on the second object, playing the conversion animation, and sending an information acquisition request to a server, the information acquisition request carrying a user identification (ID);

in response to the server acquiring a number and types of target virtual resources owned by the first object based on the user ID, receiving an object type option corresponding to the number and types of the target virtual resources returned by the server; and displaying the conversion progress indication information and the object type options being returned.

11. The method according to claim 1, further comprising:

stopping responding to a control operation on the first object within a time period during which the conversion animation is played.

12. The method according to claim 11, further comprising:

in response to an animation termination instruction, terminating playing the conversion animation, and canceling displaying the conversion progress indication information and the object type options, within the time period during which the conversion animation is played.

13. The method according to claim 1, wherein the playing the conversion animation comprises:

playing the conversion animation in a display region of the virtual scene, a screen of the virtual scene displayed in the display region being a background screen of the conversion animation; and in response to a display updating instruction for the screen of the virtual scene, updating the display of the screen of the virtual scene displayed in the display region, within a time period during which the conversion animation is played.

14. The method according to claim 1, further comprising:

in response to the completion of playing of the conversion animation, displaying the dependent virtual object of the first object in an animation form.

15. The method according to claim 1, wherein the response to the conversion operation on the second object comprises:

receiving the conversion operation on the second object, and responding to the conversion operation on the second object in response to determining that a virtual backpack of the first object comprises target virtual resources.

16. The method according to claim 1, wherein the virtual scene further comprises a collaborative object of the first object, the collaborative object of the first object and the first object belonging to a same team.

17. A virtual object control apparatus, comprising:

a memory storing a plurality of computer-readable instructions; and a processor configured to execute the plurality of computer-readable instructions, wherein upon execution of the computer-readable instructions, the processor is configured to:

display, via a display screen, a virtual scene, the virtual scene comprising a first object, a second object, a visual field focus region, and a visual field peripheral region, the first object being a virtual object controlled by a user, the second object being a virtual object not controlled by a user;

in response to an operation against the second object, control the first object to fight against the second object in the virtual scene to reduce an attribute value of the second object;

in response to the attribute value of the second object being less than a preset threshold, display conversion prompt information on the display screen;

in response to a conversion operation on the second object, play a conversion animation, and display conversion progress indication information and object type options on the display screen, by:

displaying an option indication region in a position in a display region deviating from a center point of the visual field focus region, and displaying the object type options in the visual field peripheral region; and displaying the conversion progress indication information and an option indication flag in the option indication region, the option indication flag used to indicate a target object type option being selected; and in response to a selection of the target object type option and the conversion progress indication information indicating a completion of playing of the conversion animation, convert the second object into a dependent virtual object of the first object, the target object type option being one of the object type options, an object type to which the dependent virtual object belongs being an object type indicated by the target object type option.

18. The apparatus according to claim 17, wherein a number of the object type options and object types indicated by the object type options are determined according to the number and types of target virtual resources in a virtual backpack of the first object.

19. One or more non-transitory computer-readable storage media storing a plurality of computer-readable instructions, wherein the plurality of computer-readable instructions, when executed by one or more processors, cause the one or more processors to:

display, via a display screen, a virtual scene, the virtual scene comprising a first object, a second object, a visual field focus region, and a visual field peripheral region, the first object being a virtual object controlled by a user, the second object being a virtual object not controlled by a user;

in response to an operation against the second object, control the first object to fight against the second object in the virtual scene to reduce an attribute value of the second object;

in response to the attribute value of the second object being less than a preset threshold, display conversion prompt information on the display screen;

in response to a conversion operation on the second object, play a conversion animation, and display conversion progress indication information and object type options on the display screen, by:

displaying an option indication region in a position in a display region deviating from a center point of the visual field focus region, and displaying the object type options in the visual field peripheral region; and displaying the conversion progress indication information and an option indication flag in the option indication region, the option indication flag used to indicate a target object type option being selected; and in response to a selection of the target object type option and the conversion progress indication information indicating a completion of playing of the conversion animation, convert the second object into a dependent virtual object of the first object, the target object type option being one of the object type options, an object type to which the dependent virtual object belongs being an object type indicated by the target object type option.

* * * * *